(12) United States Patent
Boillot

(10) Patent No.: US 8,316,324 B2
(45) Date of Patent: Nov. 20, 2012

(54) METHOD AND APPARATUS FOR TOUCHLESS CONTROL OF A DEVICE

(75) Inventor: Marc Boillot, Plantation, FL (US)

(73) Assignee: NaviSense, Plantation, FL (US)

( * ) Notice: Subject to any disclaimer, the term of this patent is extended or adjusted under 35 U.S.C. 154(b) by 892 days.

(21) Appl. No.: 11/850,637

(22) Filed: Sep. 5, 2007

(65) Prior Publication Data

US 2008/0059915 A1 Mar. 6, 2008

Related U.S. Application Data

(60) Provisional application No. 60/842,437, filed on Sep. 5, 2006.

(51) Int. Cl.
*G06F 3/033* (2006.01)

(52) U.S. Cl. ........ 715/863; 715/773; 715/856; 715/862; 345/156

(58) Field of Classification Search .................. 715/268, 715/701–702, 716, 754, 764, 773, 848–852, 715/856–866; 345/156–158, 168–170, 173–177
See application file for complete search history.

(56) References Cited

U.S. PATENT DOCUMENTS

| | | | | |
|---|---|---|---|---|
| 4,988,981 A * | 1/1991 | Zimmerman et al. | ........ | 345/158 |
| 5,274,363 A | 12/1993 | Koved | | |
| 5,512,919 A * | 4/1996 | Araki | ........... | 345/156 |
| 5,933,152 A * | 8/1999 | Naruki et al. | ........... | 345/501 |
| 6,130,663 A | 10/2000 | Null | | |
| 6,137,427 A | 10/2000 | Binstead | | |
| 6,198,470 B1 * | 3/2001 | Agam et al. | ........... | 345/157 |
| 6,307,952 B1 * | 10/2001 | Dietz | ........... | 382/107 |
| 6,313,825 B1 | 11/2001 | Gilbert | | |
| 6,424,334 B1 * | 7/2002 | Zimmerman et al. | ........ | 345/158 |
| 6,614,422 B1 * | 9/2003 | Rafii et al. | ........... | 345/168 |
| 6,690,354 B2 * | 2/2004 | Sze | ........... | 345/156 |
| 6,750,849 B2 * | 6/2004 | Potkonen | ........... | 345/168 |
| 6,937,227 B2 | 8/2005 | Qamhiyah | | |
| 6,943,774 B2 * | 9/2005 | Horiki | ........... | 345/158 |
| 6,982,703 B2 * | 1/2006 | Lapstun et al. | ........... | 345/173 |
| 7,054,045 B2 * | 5/2006 | McPheters et al. | ........... | 359/15 |
| 7,071,924 B2 * | 7/2006 | Wilbrink et al. | ........... | 345/168 |
| 7,078,911 B2 | 7/2006 | Cehelnik | | |
| 7,081,884 B2 | 7/2006 | Kong | | |
| 7,092,109 B2 | 8/2006 | Satoh | | |
| 7,130,754 B2 | 10/2006 | Satoh | | |
| 7,359,041 B2 * | 4/2008 | Xie et al. | ........... | 356/141.1 |
| 7,489,297 B2 * | 2/2009 | Hohmann et al. | ........... | 345/158 |
| 7,667,694 B2 * | 2/2010 | Takahashi et al. | ........... | 345/177 |
| 2003/0048312 A1 * | 3/2003 | Zimmerman et al. | ........ | 345/863 |
| 2003/0128190 A1 * | 7/2003 | Wilbrink et al. | ........... | 345/169 |
| 2003/0132913 A1 | 7/2003 | Issinski | | |
| 2004/0046795 A1 * | 3/2004 | Josephson et al. | ........... | 345/764 |
| 2004/0178995 A1 * | 9/2004 | Sterling | ........... | 345/173 |
| 2005/0003851 A1 * | 1/2005 | Chrysochoos et al. | ..... | 455/550.1 |
| 2005/0253807 A1 * | 11/2005 | Hohmann et al. | ........... | 345/156 |

(Continued)

*Primary Examiner* — Tuyetlien Tran
*Assistant Examiner* — Enrique Iturralde

(57) ABSTRACT

A touchless sensing unit (110) and method (200) for operating a device via touchless control is provided. The method can include detecting (210) a finger (310) within a touchless sensory space (101), and handling (220) a control of the device (100) in accordance with a movement of the finger. A first finger movement can be recognized for acquiring a control, and a second finger movement for selecting a control. The method can include estimating (230) a location of the finger in the touchless sensory space for acquiring the control, and identifying a finger movement (250) of the finger at the location for selecting the control.

20 Claims, 24 Drawing Sheets

U.S. PATENT DOCUMENTS

| | | |
|---|---|---|
| 2006/0010400 A1* | 1/2006 | Dehlin et al. ............... 715/856 |
| 2006/0092022 A1 | 5/2006 | Cehelnik |
| 2006/0161870 A1* | 7/2006 | Hotelling et al. ........... 715/863 |
| 2006/0161871 A1 | 7/2006 | Hotelling |
| 2006/0164241 A1 | 7/2006 | Makela |
| 2006/0224429 A1 | 10/2006 | Mathew |
| 2006/0256090 A1 | 11/2006 | Huppi |
| 2007/0075968 A1* | 4/2007 | Hall et al. .................... 345/157 |
| 2007/0127039 A1 | 6/2007 | Njolstad |
| 2007/0294639 A1* | 12/2007 | Van Berkel et al. ......... 715/830 |

* cited by examiner

Length of <OAB = Time of flight for Rx 121
Length of <OBC = Time of flight for Rx 141

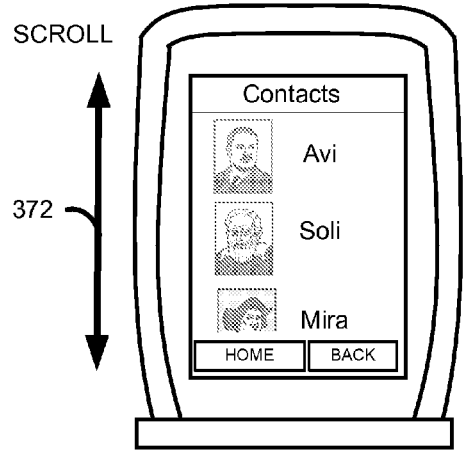
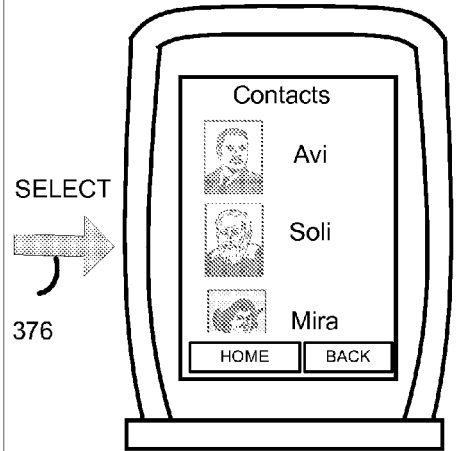
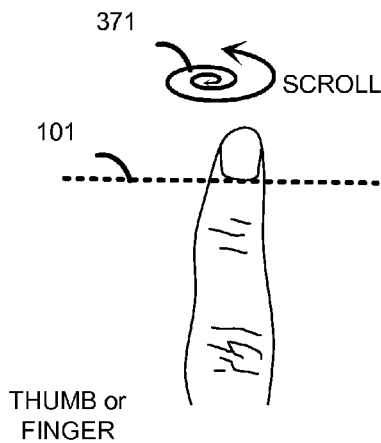
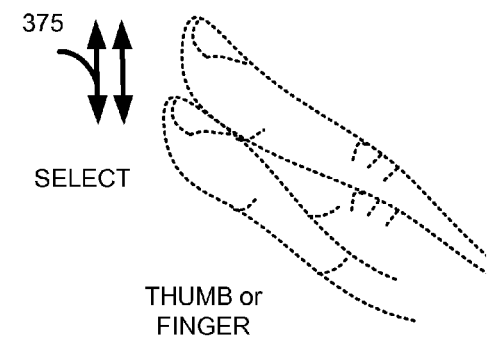
FIG 25
FIG 26

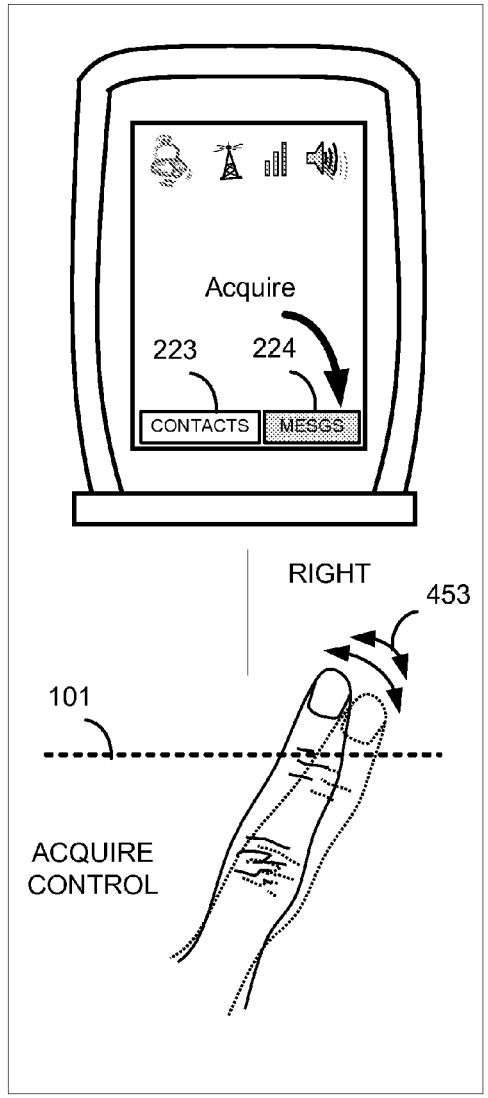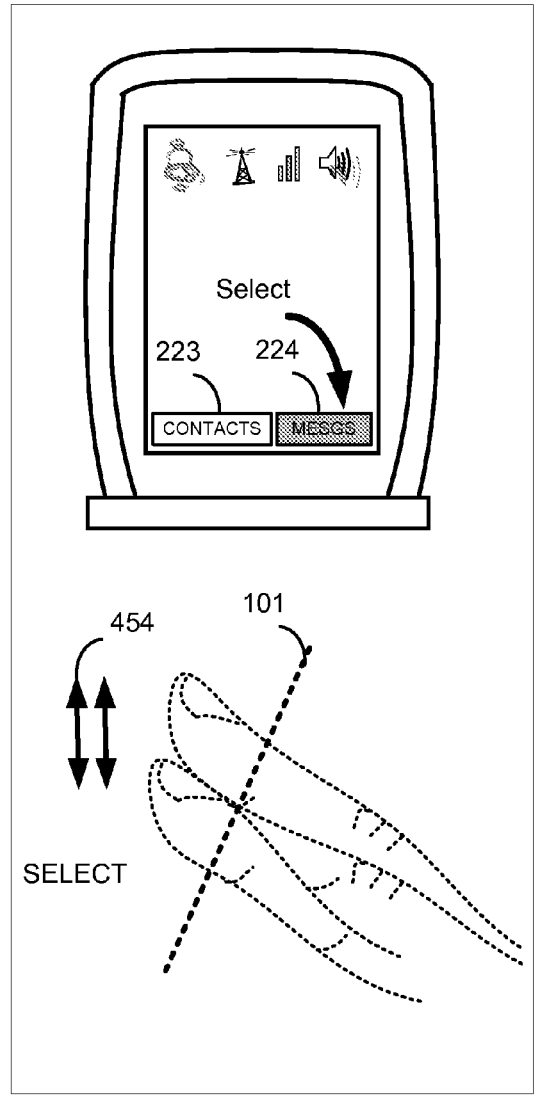
FIG 30                    FIG 31

METHOD AND APPARATUS FOR TOUCHLESS CONTROL OF A DEVICE

CROSS-REFERENCE TO RELATED APPLICATION

This application claims the priority benefit of U.S. Provisional Patent Application No. 60/842,437 entitled "Method and Apparatus for Touchless Control of a Device" filed Sep. 5, 2006, the entire contents of which are hereby incorporated by reference.

This application is also related to U.S. Patent Application No. 60/842,436, filed on the same date as this application.

BACKGROUND

1. Field

The present embodiments of the invention generally relate to the field of mobile devices, more particularly to user interfaces.

2. Description of the Related Art

Mobile communication devices such as cell phones generally include a keypad and display for allowing a user to interact with mobile device applications. A user can navigate through menus presented on the display of the mobile device by pressing one or more keys on a keypad. Some keypads include a navigation pad which allows a user to navigate menus on the keypad in an ergonomic manner. Mobile devices, such as cell phones, are generally limited in size, and thus have small keypads. The small size of the keypad can limit the ease at which users can type on the small keypad, or navigate menus on the display via a keypad, to interact with the cell phone. Such keypads have keys with a touching area that is generally smaller than the size of a user's fingertip. The keypad and the navigation pads are touch-based which require physical user interaction. That is, a user must physically touch the keypad or navigation pad to navigate through a menu system on the display.

SUMMARY

Embodiments of the invention are directed to a method and apparatus for providing touchless control of a device. The apparatus can generate a two-dimensional or three-dimensional touchless sensory field. The sensory field can be within a volume of space or projected on a surface. The apparatus can adjust at least one control of the device in response to the finger movement in the touchless sensory field. The apparatus can include a control unit for associating at least one finger movement with a control action, wherein the control action is an acquire, a select, or a release. The control unit can identify a finger movement of the finger in a region of the touchless sensory space, associate the finger movement with a control on a display of the device, and perform a control action on the control in response to the finger movement. Touchless control can begin by a physical touching of the device, a starting-up of a visual display, an opening of the device, a starting-up of an application, or a voice command.

A motion-centric method is also provided that can include detecting a finger within a touchless sensory space, and handling a control of the device in accordance with a movement of the finger. The motion-centric method can include recognizing a finger movement for selecting a control. As an example, the control unit can recognize an up-down jitter finger movement, a right-left jitter finger movement, a back-and-forth finger sweep movement, a rotational finger movement, or a finger swipe movement. The finger movements can be associated with one or more controls. In one arrangement, the method can include recognizing an up-down jitter finger movement in the touchless sensory space, and scrolling a menu to a menu entry in accordance with the up-down jitter finger movement. A finger swipe movement can be recognized for selecting the menu entry. In another arrangement, the method can include identifying a pause of the finger during the scrolling, acquiring the menu item in response to the pause, and selecting the menu entry in response to a button press. The acquiring can temporarily lock touchless control to prevent association of a second finger movement with a second scrolling during the button press. The menu entry can be visually enhanced during acquire for informing a user that a button press may select the menu item. The method can also include recognizing a back-and-forth finger sweep, and changing a direction of the scrolling in response to the back-and-forth finger sweep.

A location-centric method is also provided that can include detecting a presence of a finger within a touchless sensory space, tracking a movement of the finger within the touchless sensory space, and handling a control of the device in accordance with the finger movement. The location-centric method can include estimating a location of the finger in the touchless sensory space for acquiring a control, and identifying a finger movement of the finger at the location for selecting the control. In one aspect, the location can be an absolute location such that a location of the finger in the touchless sensory space can be associated with a control in the display. In another aspect, the location can be a fuzzy location such that a movement of the finger in an approximate region of the touchless sensory space is associated with a control in the display. The method can include acquiring the control in response to detecting a first jitter finger movement at the location, and selecting the control in response to a second jitter finger movement. The second jitter finger movement may or may not be at the location. The acquiring can lock the control, such that while the control remains locked, the second jitter finger movement in the touchless sensory space does not acquire a second control.

As one example, a left-right jitter finger movement of the finger can be identified for acquiring a control on the display, and an up-down jitter finger movement of the finger can be identified for selecting the control. A first audible or first visual acknowledgement can be presented upon acquiring the control, and a second audible or second visual acknowledgement can be presented upon selecting the control. As another example, a first up-down jitter finger movement followed by a second up-down jitter finger movement can acquire and then select the control. A pause can be detected for differentiating between the first and second movement. In a first arrangement, a left-right jitter movement can be identified in a right region of the touchless sensory space for acquiring a right control on a right of the display, and an up-down jitter movement of the finger in the touchless sensory space can be identified for selecting the right control. In a second arrangement, a left-right jitter movement can be identified in a left region of the touchless sensory space for acquiring a left control on a left of the display, and an up-down jitter movement can be identified for selecting the left control.

Methods of releasing an acquired control are also provided. The finger movements for releasing an acquired control can depend on the application. In one case, a voice command can be recognized for releasing an acquired control. In another case, a back-and-forth sweep can be recognized for releasing an acquired control. In yet another case, a physical touching of the device can release an acquired control. A visual indicator can inform a use that an acquired control has been released. Visually displaying can include highlighting the control on the display, flashing the control, changing a color of the control, or changing a descriptive attribute of the control.

Embodiments of the invention are also directed to a method for touchless entry on a device. The method can include detecting a presence of a finger within the touchless sensory space, tracking a movement of the finger within the touchless sensory space, displaying a cursor object that moves in accordance with the movement, and handling a control in response to a location of the cursor object. The cursor object can be a free floating icon, a cursor, an avatar, a translucent text box, or a zoom window. The control can be a soft-key for a menu entry, a menu option, a scrolling list, a key-pad entry, a camera control, or a number dial. The method can include detecting when the cursor object is over a control to acquire the control. An audible or visual acknowledgement can be presented for informing a user that the control has been acquired. The method can include detecting a finger swipe motion when the cursor object is over the control, and selecting the control in response to the finger swipe motion. The method can further include detecting a finger pause when the cursor object is over the control, and selecting the control in response to the finger pause. The method can be repeated for entering a phone number, entering a text message, entering a numeric code, or an alpha-numeric message.

A method for detecting a finger swipe motion is also provided. The method can include detecting an accelerated finger movement for selecting the control by calculating a time-averaged velocity of the finger movement, and determining whether the time-averaged velocity is approximately constant. If the time averaged velocity is approximately constant, the tracking the movement of the finger can continue, and the control is not selected. If the time-averaged velocity increases above a threshold, the control can be selected.

BRIEF DESCRIPTION OF THE DRAWINGS

The features of the embodiments of the invention, which are believed to be novel, are set forth with particularity in the appended claims. Embodiments of the invention, together with further objects and advantages thereof, may best be understood by reference to the following description, taken in conjunction with the accompanying drawings, in the several figures of which like reference numerals identify like elements, and in which:

FIG. 25 is another illustration for scrolling via rotational finger movement in accordance with an embodiment of the inventive arrangements;

FIG. 26 is another illustration for selecting a menu entry via up-down jitter finger movement in accordance with an embodiment of the inventive arrangements;

FIG. 30 is an illustration for acquiring a right control via left-right jitter finger movement in accordance with an embodiment of the inventive arrangements;

FIG. 31 is an illustration for selecting the right control via up-down jitter finger movement in accordance with an embodiment of the inventive arrangements;

DETAILED DESCRIPTION

Figure 1:
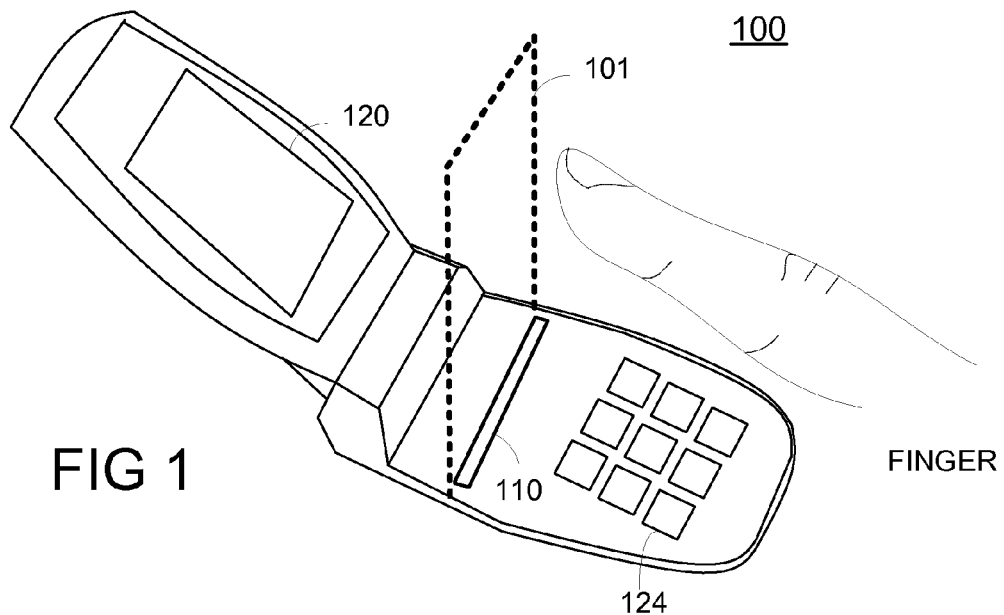
FIG. 1 is a touchless interface for a mobile device in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system.

The term "space" can be defined as exhibiting a three-dimensional aspect. The term "sensory space" can be defined as a three-dimensional volume. The term "field" can be defined as exhibiting a two-dimensional or three-dimensional aspect. The term "earpiece" can be defined as a device that fits on a person's head or an earpiece device that fits within or around a person's ear. The term "touchless" can be defined as not requiring physical touch. The term "presence" can be defined as placement within a sensory space. The term "control" can be defined as a handle to an object which can adjust one or more attributes or references to the object. The term "control action" can be defined as a button press, a soft-key press, a selection, a scroll, an entry for activating a control. The term "menu" can be defined as a list of items or options. The term "jitter movement" can be defined as a brief localized motion. The term "left-right jitter finger movement" can be defined as a brief localized fluctuation of the finger in a left and right direction. The term "up-down jitter finger movement" can be defined as a brief localized fluctuation of the finger in a an up and down direction. The term "back-and-forth sweep finger movement" can be defined as a broad sweeping movement of a finger. The term "soft-key" can be defined as a software control. The term "cursor" can be defined as an object that can move freely. The term "absolute location" can be defined as a one to one mapping of a first location to a second location. The term "relative location" can be defined as a second location in relation to a first location. The term "fuzzy location" can be defined as an approximate location. The term "acquire" can be defined as creating a handle to an object. The term "select" can be defined as selecting an object. The term "handle" can be defined as a reference to an object. The term "touchless" can be defined as without physical contact of an object. The term "touchless control" can be defined as a control that can be handled and selected without physically touching an object.

Figure 2:
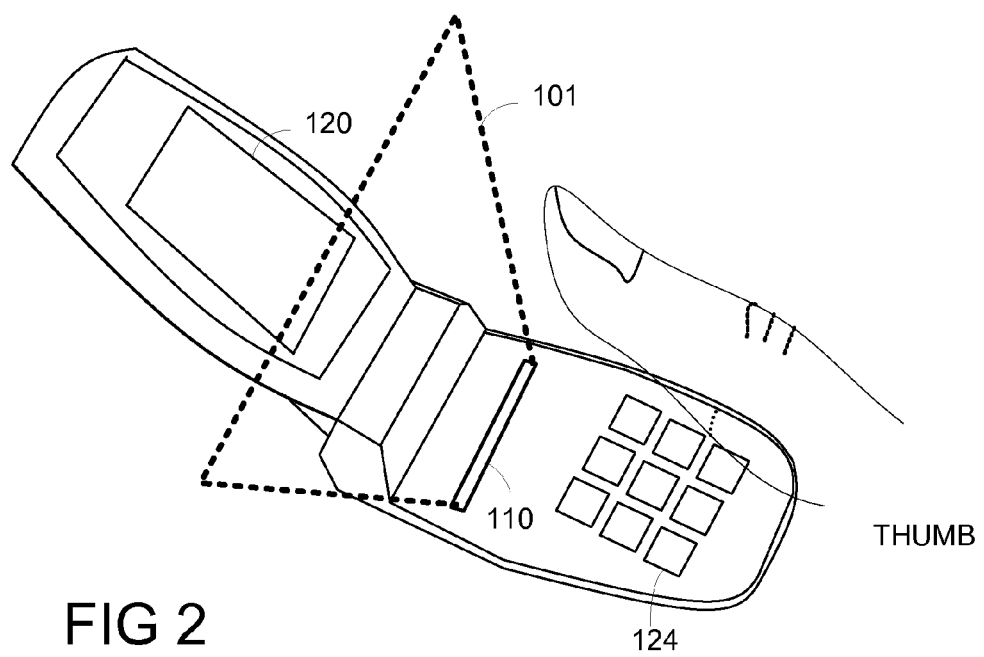
FIG. 2 is a wider touchless interface for a mobile device in accordance with an embodiment of the inventive arrangements.

Referring to FIG. 1, a mobile device 100 having a touchless user interface is shown. The touchless user interface is provided via a touchless sensory field 101 that allows a user to interact with the mobile device 100 via touchless control finger movements. In the arrangement shown, the touchless sensing unit 110 can be configured with the mobile device 100 to project the touchless sensory field 101 in a direction approximately perpendicular to a keypad 124. In this manner, the touchless user interface can be associated with the keypad and is separate from the display 120. In another arrangement, the touchless sensory field 101 can also be approximately perpendicular to the display 120. The mobile device 100 can be a cell phone, a radio, a portable music player, a personal security device, an emergency device, a personal digital assistant, a portable memory device, a personal profile device, a hand-held game, or any other suitable device. As another example, the touchless sensing unit 110 may be a control component in a vehicle, or a computer keyboard system. The touchless sensing unit 110 can be integrated with the mobile device 100 such as shown in FIG. 1, as an example, but is not limited to such an arrangement. Referring to FIG. 2, a wider touchless sensing field 101 is shown. The wide aspect is well suited for using a thumb for touchless control.

The mobile device 100 can operate in a general mode or a touchless control mode. In general mode, a user touches one or more soft-keys on a keypad 124 of the mobile device 100 for interacting with objects in the display 120, as is known in the art. In touchless control mode, the user can interact with the objects in the display 120 via touchless finger movements. For example, a user can point the finger to the right to acquire control of a menu item on a right in the display 120, or point to the left to acquire a control of a menu item on the left in the display 120. The term finger is used synonymously with the term thumb when referring to touchless control unless otherwise indicated. A user can perform a finger movement to select an object, wherein the touchless sensing unit 110 recognizes the behavior and associates the behavior with a control. As another example, a user can adjust an audio control such as bass, treble, or volume by issuing touchless controls. For instance, the user can move a finger up and down to change a volume, or perform a double click to select a song.

As another example, a user can scroll through and select voice mails or emails via touchless control.

Figure 3:
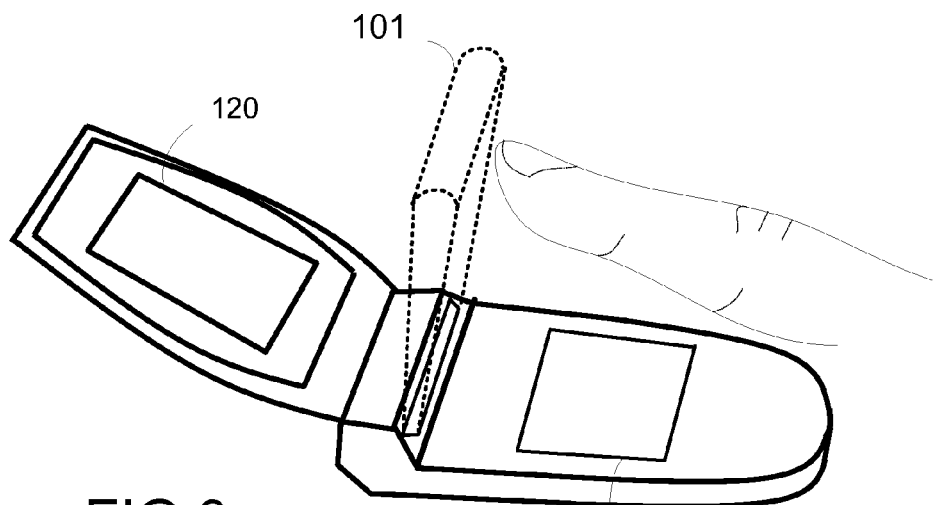
FIG. 3 is a first location of a touchless sensing unit on a mobile device in accordance with an embodiment of the inventive arrangements.
Figure 4:
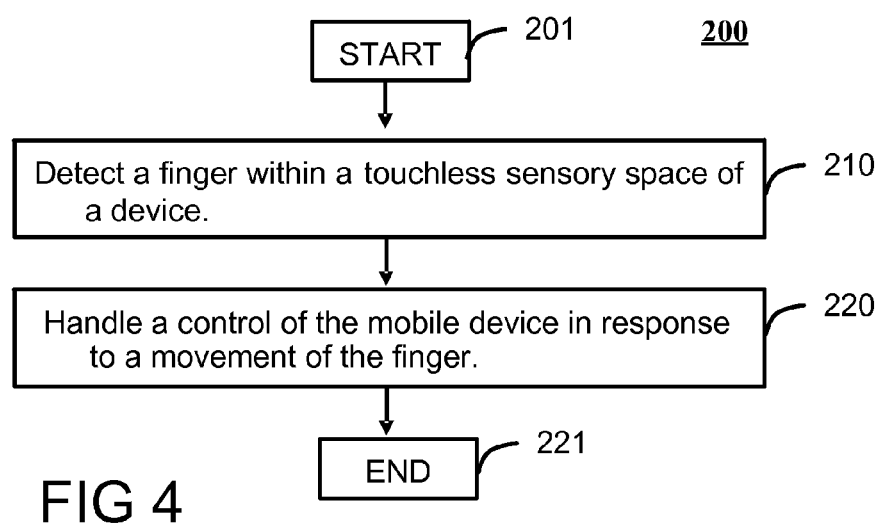
FIG. 4 is a method for touchless control of a device in accordance with an embodiment of the inventive arrangements.

Briefly, referring to FIG. 3, a first location of the touchless sensing unit 110 on the mobile device is shown. In this arrangement, the touchless sensory field 101 projects more towards the user than when the touchless sensing unit 110 is directly above the keypad 124 as shown if FIG. 1. Referring to FIG. 4, a method 200 for touchless control of a device is shown. The method 200 can include detecting (210) a finger within a touchless sensory space, and handling (220) a control of the device in accordance with a movement of the finger.

In practice, a user can interact with one or more controls on the display 120 of the mobile device 100 via touchless control. For example, a user can move a finger or a thumb in the touchless sensory field 101 to control one or more objects in the display 120. An object may be a menu item, an entry, a scroll list, a mobile device control, or any other suitable item that can be handled or accessed by the mobile device 100. For example, a user can select menu buttons on the display 120 by issuing certain finger movements, or locations of the finger, associated with the control. Notably, the touchless sensory field 101 is located sufficiently close to normal hand movement associated with the keypad 124. In particular, the touchless sensory field 101 is located within a thumb reach of the keypad 124 when a thumb is used for touchless control. Accordingly, a user can switch between physically pressing keys on the keypad 124 using a thumb and interacting with the mobile device via touchless sensing using a thumb.

Touchless mode can be location-centric or motion-centric. In the location-centric mode, each location of the finger in the touchless sensory space 101 can be associated with a location on the display 120. Accordingly, each finger can be mapped to a control on the display 120. For example, the user can navigate to objects in the display 120 by moving the finger to a location in the touchless sensory field 101 that corresponds to the location of the object in the display 120. In motion-centric mode, a relative movement of the finger can be associated with a control on the display 120. For example, a rotational finger movement can be associated with a scrolling action for scrolling through menu items on the display 120. The rotational movement may or may not depend on the location of the finger. For example, the user can issue the rotational movement anywhere in the touchless sensory space 101 for performing a scrolling operation. As another example, an up-down jitter movement can be associated with a particular control, that can be issued anywhere in the touchless sensory field 101. That is, the location of the finger movement is not required for interpreting finger movements because the pattern of finger movement is associated with the control, and not the location.

In general, a user may be holding the mobile device with one hand and performing touchless control with the same hand or the other hand. In the former, a user can position the mobile device 100 within the palm of the hand and position the thumb of the same hand within the sensing field. The user can move the thumb in various directions to interact with the mobile device 100 via touchless control. For example, the user can use the thumb to navigate to certain menu entries in the display, or perform certain thumb movements to acquire a control. In the latter, a finger of the second hand of the user may be used for touchless control of the mobile device. For example, the user can hold the mobile device in the first hand and use an index finger of the second hand to perform touchless control. The finger of the second hand may provide the user with more finger movement variability in the touchless sensory field. That is, the finger movement of the second hand may span a broader usage area, than the thumb which may be limited in physical movement due to the simultaneous handling of the phone.

Figure 5:
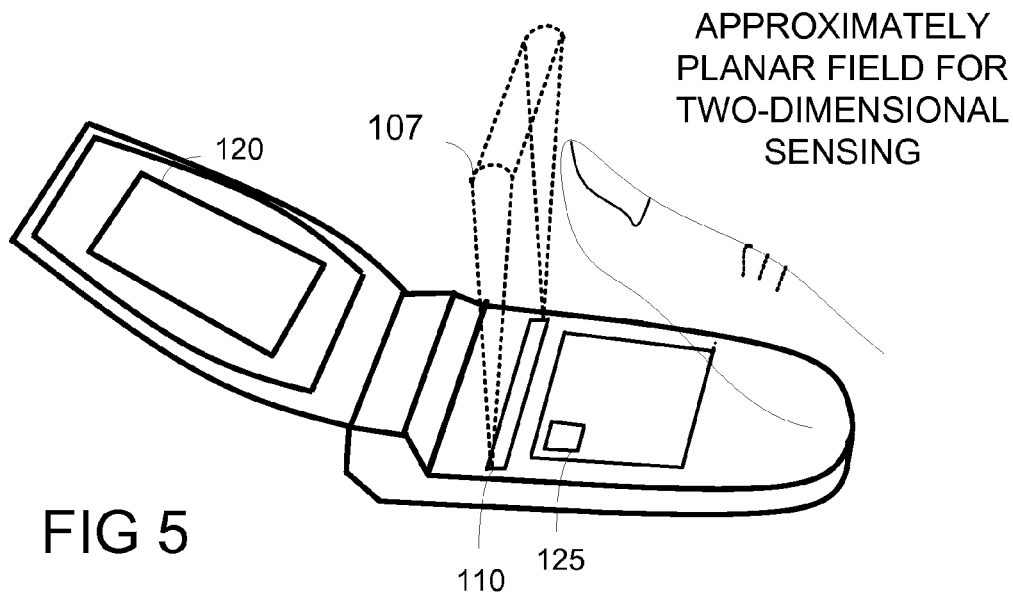
FIG. 5 is an approximately planar touchless sensory field in accordance with an embodiment of the inventive arrangements.

The touchless sensing unit 110 can include settings to adjust a strength, or projection capability, of the touchless sensory field. For example, referring to FIG. 5, the touchless sensing unit 100 can be set to provide an approximately planar touchless sensory field 107. The approximately planar sensory field 107 may be useful for two-dimensional control, such as navigating a cursor on the display 120 in accordance with a finger movement. A narrow sensory field may be beneficial when using a thumb of the first hand as discussed in FIG. 4. As another example, two-dimensional control can be used to select an object on the display 120, such as a list of menu items. An approximately planar sensory field 107 is beneficial when general keypad use is combined with touchless control. For example, the approximately planar sensory field 107 projects sufficiently out of range of the keypad 124, such that a user can use the keypad 124 without acquiring touchless control. That is, the finger is not within the touchless sensory field 107 and not obtaining any controls on the display 120 when the user is using the keypad.

Moreover, this allows different controls to be assigned to touchless finger movements than those on the keypad. For example, the keys on the keypad 124 can be associated with a certain set of objects on the display 120, and the touchless sensory field 101 can either be associated with the same keys or different keys. For example, a user may press a volume button of an audio control, which activates touchless control to allow the user to move a finger up and down to change the volume. In this case, the volume button is an attribute of the audio control, and the volume level is a value of the attribute. Accordingly, different applications can assign different touchless controls to certain key or menu items in a user interface depending on the application.

Moreover, the approximately planar sensory field 107 allows the touchless sensing unit 110 to differentiate between a finger and a thumb. The thumb is generally wider in area than a finger tip and thus provides a stronger reflection. Accordingly, a return signal strength of a finger and a thumb can be compared for identifying the presence of either the finger or thumb. In practice, a history of the signal strength returns at specific locations are saved and compared to current signal strength returns at the same specific locations. The signal strengths are compared to strengths captured during calibration when it is known whether the user is using a finger or thumb. Secondly, the range which the thumb spans is less than the range the finger can move. When a thumb of the first hand that is handling the mobile device is used for touchless control, the thumb is more limited in movement. In contrast, the finger of the second hand generally spans a wider range for touchless control. Moreover, certain applications may require broader movement. The touchless sensing unit 110 can assess the signal strength return in combination with the finger movement range to differentiate between a thumb and a finger. Also, depending on whether a finger or a thumb is detected, different control options can be presented. For example, less involved user interfaces can be presented for thumb mode, and more sophisticated interfaces can be used for finger mode.

Figure 6:
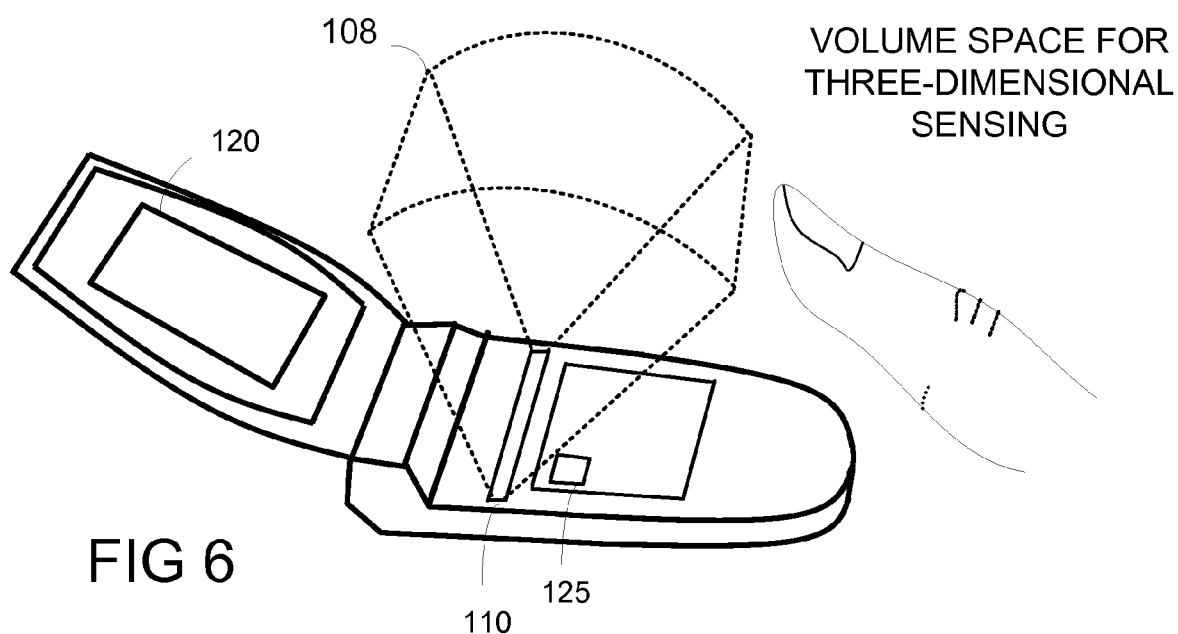
FIG. 6 is a touchless sensory space in accordance with an embodiment of the inventive arrangements.
Figure 7:
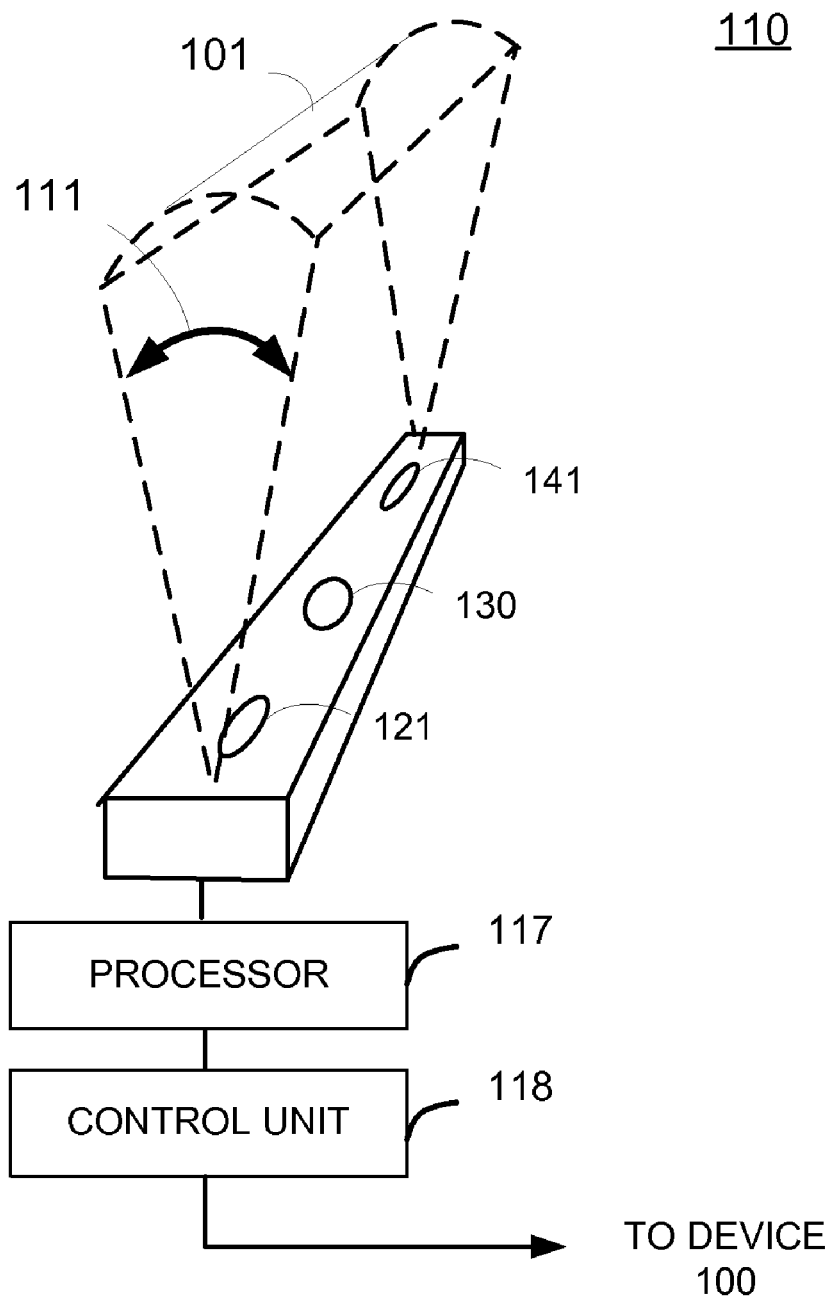
FIG. 7 is a touchless sensing unit in accordance with an embodiment of the inventive arrangements.

Referring to FIG. 6, the touchless sensing unit 100 can be set to provide a touchless sensory space 108. For example, the touchless sensory field 101 of FIG. 1 can be broadened to encompass a wider volume for detecting finger movement. A user can move a finger anywhere within the touchless sensory space 108 to interact with the mobile device 100. In particular, the touchless sensory space 108 of FIG. 6 provides a third dimension to the touchless sensory field 107 of FIG. 5. A broader sensory space is beneficial when using a finger of the second hand as discussed in FIG. 4. In such regard, a forward projecting and retracting finger movement can be identified and associated with another control, or another aspect of a control. For example, a user may be playing a three dimensional video game. The user can control a movement of a character in the video game via touchless finger movement. For example, the user can move the character left and right through left and right finger movement, up and down through up and down finger movements, and ahead and back through forward projecting and retracting finger movements.

Moreover, more controls can be assigned to movement in the touchless sensory space 108. For example, upon pressing an audio control button, a surround sound touchless control can be presented. The user can move the finger left and right to control balance, forward and back to control pan, and up and down to control volume. Similarly, an illustration for the audio settings can be presented on the display 120 to provide visual feedback of the touchless settings. As another example, upon pressing a navigation button, a touchless control for a map can be presented. The user can move the finger left and right to move the map east or west, move the finger up and down to move the map north and south, and move forward and back to change a zoom of the map.

In the foregoing, a detailed description of the touchless sensing unit 110 and the mechanisms of operation for touchless sensing is presented as one embodiment. In particular, FIGS. 7-10 are directed to ultrasonic sensing for touchless control, though other sensing topologies are herein contemplated such as surface acoustic wave, capacitive based, infrared, optical, or dispersive signal processing technologies Referring to FIG. 7, the touchless sensing unit 110 is shown. Briefly, the touchless sensing unit generates a touchless sensory field, tracks a finger movement, and adjusts at least one control of a device in response to the finger movement. The touchless sensing unit 110 can include at least one sensor 130 for transmitting at least one signal that reflects off a finger and produces a return signal that is received by the touchless sensing unit 110. In one arrangement, the touchless sensing unit 110 can include a first pair of receivers 121/141 for capturing a first reflection and a second reflection of the at least one signal reflected off the finger. The touchless sensory field 101 is created in response to the transmitting and receiving. That is, the touchless sensing unit 110 continually transmits signals and detects return signals for monitoring movement. The touchless sensory field may have a projection up to 12 inches which depends on the strength of the emitted signal and the receiver sensitivities. The touchless sensing unit 110 can include a processor 117 operatively coupled to the at least one sensor and first pair of sensors for identifying a location and a movement of the finger in the touchless sensory field 101 based on the first reflection and the second reflection. The touchless sensing unit 110 can include a control unit 118 for receiving the location and the movement information from the processor 117. The control unit can associate at least one finger movement with a control action, wherein the control action can be an acquire command, a select command, or a release command, but is not limited to such. The control unit 118 can interface with the mobile device 100 to adjust one or more controls of the mobile device 100. The processor 117 and the control unit 118 are not restricted to being separate components. They can be integrated together with the sensors on a single board. The touchless sensory field 110 can be tilted towards the user by physically tilting the touchless sensing unit 110.

The touchless sensory field 101 can deviate slightly within a bounds 111 which provides a variation for confirming the presence of a finger. The bounds 111 allows the sensory field to angle towards the user thereby allowing a user to lift a finger and penetrate the touchless sensory field without having to lift the hand far. In this arrangement, normal keypad motion does not interfere with touchless control. The bounds 111 also correspond to a predetermined range based on phase angle measurements. Accordingly, the touchless sensory field 101 is not restricted to being perpendicular to the keyboard, or parallel the display 120. The touchless sensory field 110 can be angled towards the user for facilitating touchless control. In such an arrangement the user does not need to move the hand forward as much to enter the touchless sensory field 101.

Figure 8:
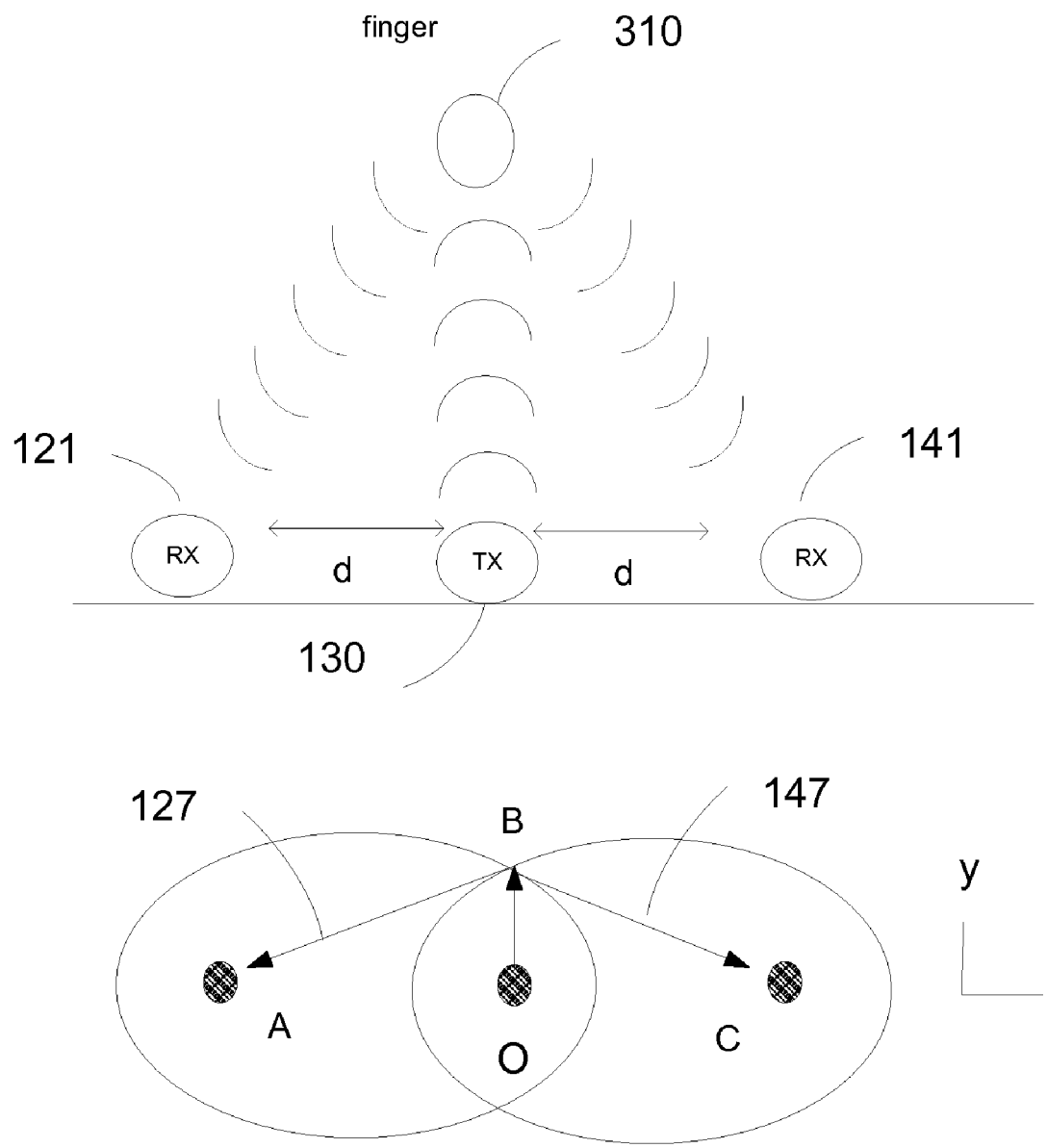
FIG. 8 is an illustration for touchless sensing in accordance with an embodiment of the inventive arrangements.

Referring to FIG. 8, an illustration for touchless sensory detection is shown. Recall, the touchless sensing unit 110 can include at least one transmitter 130 and a plurality of receivers for transmitting and receiving ultrasonic signals. The transmitter may also be one of the receivers. Moreover, the receivers may also perform as transmitters. As an example, the left receiver 121 and the right receiver 141 are shown for illustrating principles of transmit and receive signal processing. The transmitter 130 and receivers 121 or 141 can be the same element for providing dual transmit and receive functions. In one arrangement, the sensors (130, 121 and 141) can be an array of ultrasonic transducers, micro-acoustic microphones, micro speakers, or micro-electro mechanical MEMS microphones for transmitting and receiving audio signals. In another arrangement, the sensors can be CCD camera elements, optical elements, LED elements, or MEMS camera elements for receiving light. In the case of using ultrasonic sensing elements, the touchless sensing unit 110 can employ pulse-echo detection to estimate a range and position of a finger 310 within view of the sensing elements. In this arrangement, the transmitter 130 emits a pulse signal that reflects off the finger 310, which is detected by a receiver element 121 and 141 in the sensing unit. The receiver elements 121 and 141 are coupled with the processor 117 (See FIG. 7) in the sensing unit 110 to detect a signal reflected off the finger. The processor 117 can include additional processing logic such as thresholds, comparators, logic gates, clocks, and the like for detecting an object's position and motion in accordance with pulse echo range detection. In practice, the sensing unit 110 can calculate a position of the object based on a plurality of reflections by solving a series of geometric equations.

For example, referring to the diagram of FIG. 8 illustrating the intersection of two ellipses, time of flight measurements OBA 127 and OBC 147 are shown. During operation, the sensory unit 110 calculates a first range of the finger 310 using the transmitter 130 and receiver 121. The first range 127 can be determined by calculating the first time of flight OBA 127 between the signal transmitted at the transmitter and the echo of the signal reflected off the object 310 received by the receiver 121. The second range 147 can be determined by calculating a second time of flight OBC 147 between the signal transmitted at the transmitter and the echo of the signal reflected off the object 310 received by the receiver 141. The processor 117 (See FIG. 7) can estimate a position (e.g. location) of the object causing the signal reflection by mathematically combining geometrically related range measurements.

Figure 9:
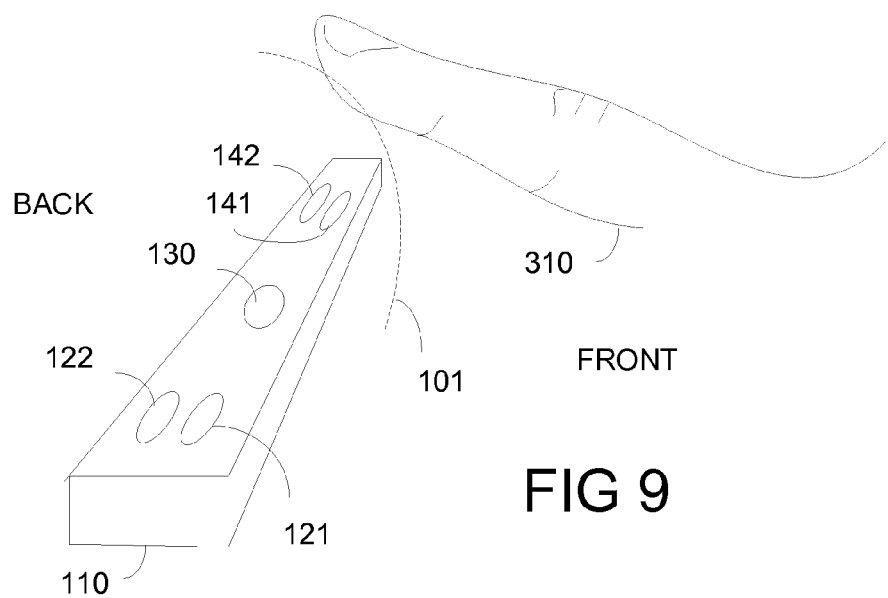
FIG. 9 is an illustration for interacting with a touchless sensing unit in accordance with an embodiment of the inventive arrangements.

Referring to FIG. 9, the sensing unit 110 can employ a paired receiver arrangement as shown. In particular, a first pair of receivers (121 and 122) are positioned on a left of the sensing unit 110 and a second pair of receivers (141 and 142) are positioned on a right side of the sensing unit 110. The designation of left and right are relative to the long dimension of the touchless sensing unit 110. It should be noted, the paired receiver arrangement is not limited to a left and right arrangement. As shown, a first receiver 121 and a second receiver 122 of the first pair are oriented in a front back arrangement. The second pair of receivers is similarly oriented. Notably, the receivers are small enough such that the sensing unit 110 is relatively slender. For example, the receivers can be MEMS sensors on the order of 1 mm width, length, and height. Moreover, the receivers in a pair are close enough such that a phase difference between an echo return captured at both receivers is less than a wavelength. For example, the receivers can be positioned at a distance that corresponds to not more than a wavelength separation. A wavelength corresponds to a period of a frequency of the transmitted signal emitted by the transmitter 130. For example, a difference in time of flight measurements can be evaluated to determine if the time of flights are within a predetermined range. In the exemplary embodiment, the first pair of receivers (121-122), the transmitter 130, and the second pair of receivers (141-142) are configured in an in-line orientation. That is, they are approximately along a straight line. The in-line paired design of the sensing unit 110 allows for the sensing unit 110 to be placed in-line with a keyboard such as that shown in FIG. 1, or FIG. 2. For example, the sensing unit 110 can be integrated between numeric keys at the top of the keypad 104 and below function keys. Or the sensing unit 110 can be placed above the function keys.

Notably, the touchless sensing unit 110 can contain multiple sensing elements positioned and arranged in various configurations for receiving range measurements in varying directions for calculating the position and movement of the object causing the reflection using multi-path signal processing techniques. Moreover, the paired transmit and receive elements can be on a same principal axis or a different principal axis. The touchless sensing unit can also employ beamforming techniques for estimating the objects location. The touchless sensing unit 110 can attach to a computer for moving a cursor object in accordance with a detected movement.

Figure 10:
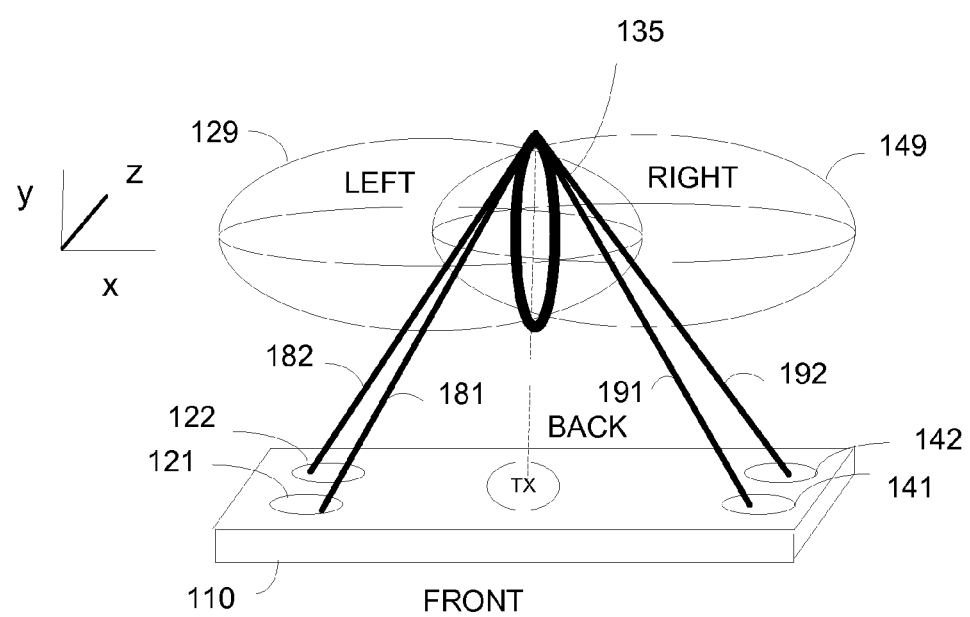
FIG. 10 is a depiction for generating a touchless sensory field in accordance with an embodiment of the inventive arrangements.

Referring to FIG. 10, a diagram of the sensing unit 110 showing the paired receiver orientation is presented. In particular, a reference volumetric surface 129 and the corresponding time of flights (TOFs) 181 and 182 are shown. Similarly, a reference volumetric surface 149 and the corresponding time of flights (TOFs) 191 and 192 are shown. Due to the front and back arrangement of the paired receivers, when the object 310 is directly above the sensing unit 110, TOF 181=TOF 182, and TOF 191=TOF 192. When the object is forward of center, TOF 181<TOF 182, and TOF 191<192. When the object is back of center 181>TOF 182, and TOF 191>192. Notably, the front and back orientation of the receivers allows for a determination of when the object is centered above the sensing unit 110 based on TOF measurements. Accordingly, a difference between TOFs can be evaluated to determine when the TOFs are approximately equal. More specifically, a phase angle can be measured between two echo returns captured at a pair of receivers for determining a centering of the object. Due to the symmetrical arrangement, an approximately planar sensory field (101) as that shown in FIG. 7 can be created.

Briefly, referring back to FIG. 7, the touchless sensing unit 110 includes the first pair of receivers (121/122) for capturing a first reflection and a second reflection of the at least one signal reflected off the finger, and the second pair of receivers (141/142) for capturing a third reflection and a fourth reflection of the at least one signal reflected off the finger. The first pair of receivers, the second pair of receivers, and the at least one transmitter are positioned approximately in-line to one another for allowing the processor to estimate a first phase angle of the finger movement based on the first and second reflection, estimate a second phase angle of the finger movement based on the third and fourth reflection, and evaluate whether the first phase angle and second phase angle are within a predetermined range. It the phase angles are within a predetermined range, the processor can confirm a presence of the finger within the approximately planar sensory field, and track the location and movement of the finger in the approximately planar sensory field.

Figure 11A:
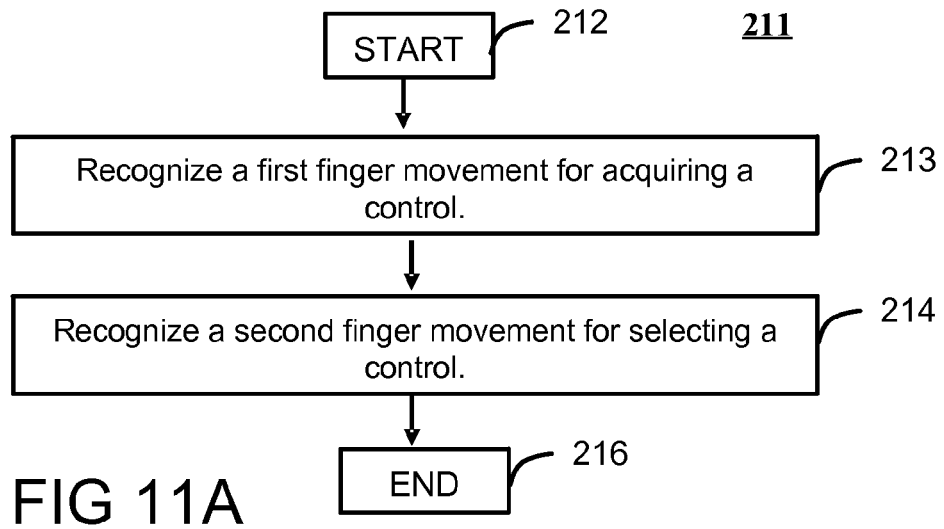
FIG. 11A is a method for motion-centric touchless control in accordance with an embodiment of the inventive arrangements.

Referring to FIG. 11A, a method 211 for motion-centric touchless control is shown. The method 211 can be practiced with more or less than the number of steps shown. To describe the method 211, reference will be made to FIGS. 7 and 12-14 although it is understood that the method 211 can be implemented in any other suitable device or system using other suitable components. Moreover, the method 211 is not limited to the order in which the steps are listed in the method 211 In addition, the method 211 can contain a greater or a fewer number of steps than those shown in FIG. 11B. The method 211 employs an acquire and select mode of operation for touchless control.

At step 212, the method 211 can start. At step 213, a first movement can be recognized for acquiring a control. For example, referring back to FIG. 7, the processor 117 can be trained to recognize one or more finger movements. For example, the processor 117 can be trained during a calibration session to differentiated between up-down movements, left-right movements, rotational movements, and finger swipe movements. Accordingly, the processor 117 can recognize a first finger movement associated with the acquiring a control. For example, a user may assign a first finger movement, such as an up-down movement, for acquiring a control. During acquire, a second finger movement will not acquire another control. Returning back to FIG. 11A, at step 214, a second movement can be recognized for selecting the control. For example, referring back to FIG. 7, the processor 117 can be trained to recognize one or more finger movements as previously mentioned. Upon recognizing a second finger movement, the controller 117 can select the control. The acquire and select approach can also be used in a location-centric approach.

Figure 11B:
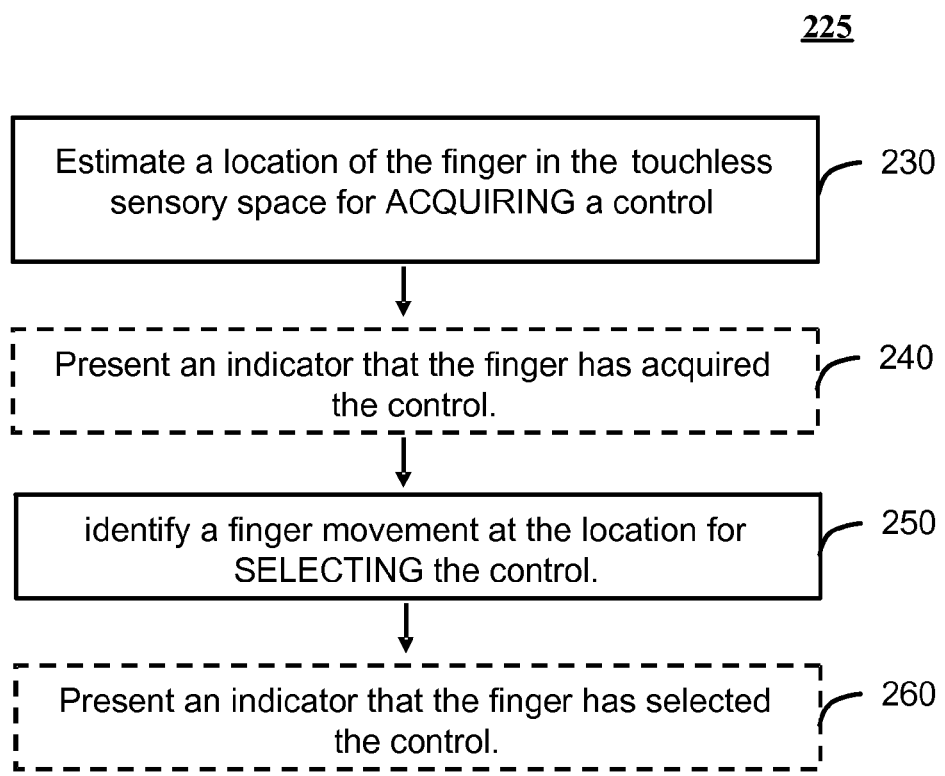
FIG. 11B is a method for location-centric touchless control in accordance with an embodiment of the inventive arrangements.
Figure 12:
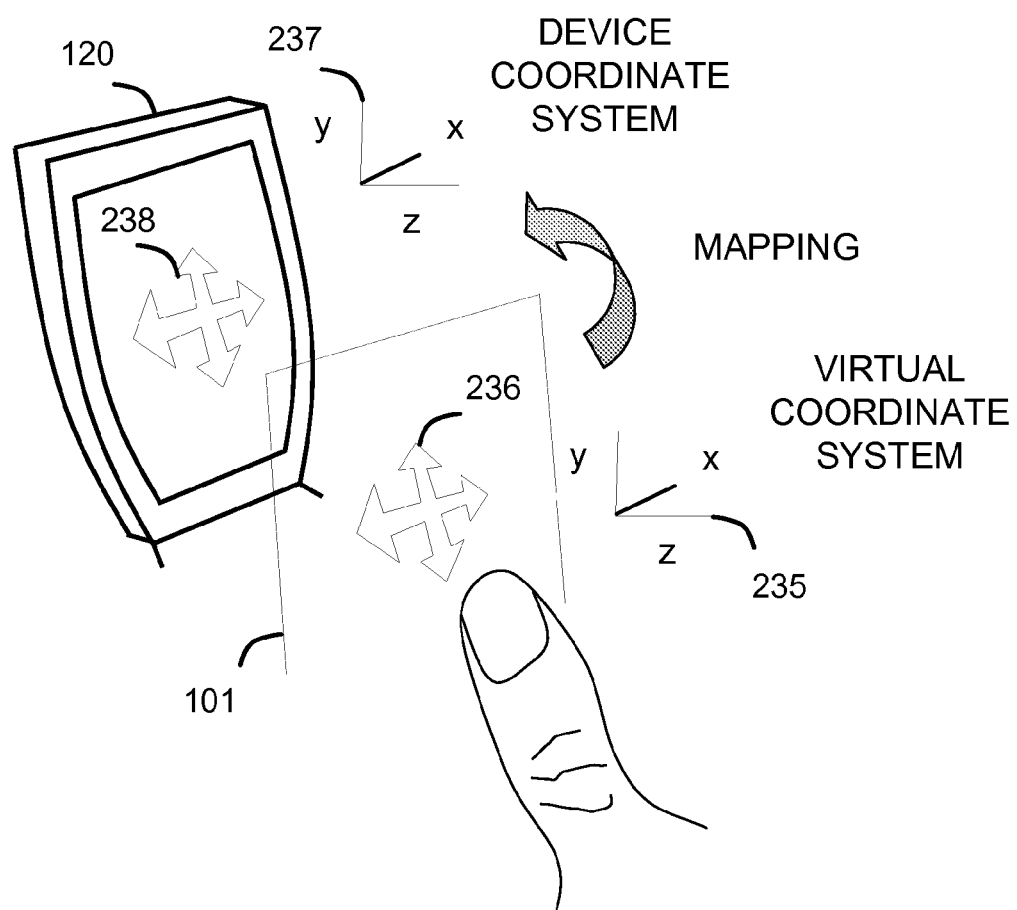
FIG. 12 is an illustration of a virtual coordinate system mapped to a device coordinate system in accordance with an embodiment of the inventive arrangements.

Referring to FIG. 11B, a method 225 for location-centric touchless control using the method 211 for acquire and select is shown. The method 225 can be practiced with more or less than the number of steps shown. To describe the method 225, reference will be made to FIGS. 7 and 12-14 although it is understood that the method 225 can be implemented in any other suitable device or system using other suitable components. Moreover, the method 225 is not limited to the order in which the steps are listed in the method 225 In addition, the method 225 can contain a greater or a fewer number of steps than those shown in FIG. 11B. Briefly, the method 225 detects a presence of a finger within a touchless sensory space, tracks a movement of the finger within the touchless sensory space, and handles a control of the device in accordance with the finger movement. In particular, the method 225 employs an acquire and select mode of operation for touchless control.

At step 230, a location of the finger in the touchless sensory space can be estimated for acquiring a control. Acquiring a control means that a handle can be created to a control. For example, referring back to FIG. 7, the processor 117 can estimate a location of the finger as discussed in FIG. 7-10 via multi-path signal processing techniques. Upon estimating the location of the finger, the processor 117 associates the location with a control in the display 120. For example, referring to FIG. 12, a virtual coordinate system 235 and a device coordinate system 237 is shown. The virtual coordinate system 235 is associated with a range of finger movements 236 in the touchless sensory field. The device coordinate system 237 is associated with a range of locations 238 in the display 120. It should be noted, the touchless sensing unit can be calibrated to map the virtual coordinate system 235 to the device coordinate system 237. That is, the locations in the virtual coordinate system 235 are mapped to locations in the display 120. Accordingly, the touchless sensing unit 110 (See FIG. 3) producing the touchless sensing field 101 can associate a location of the finger with a control in the display.

Figure 13:
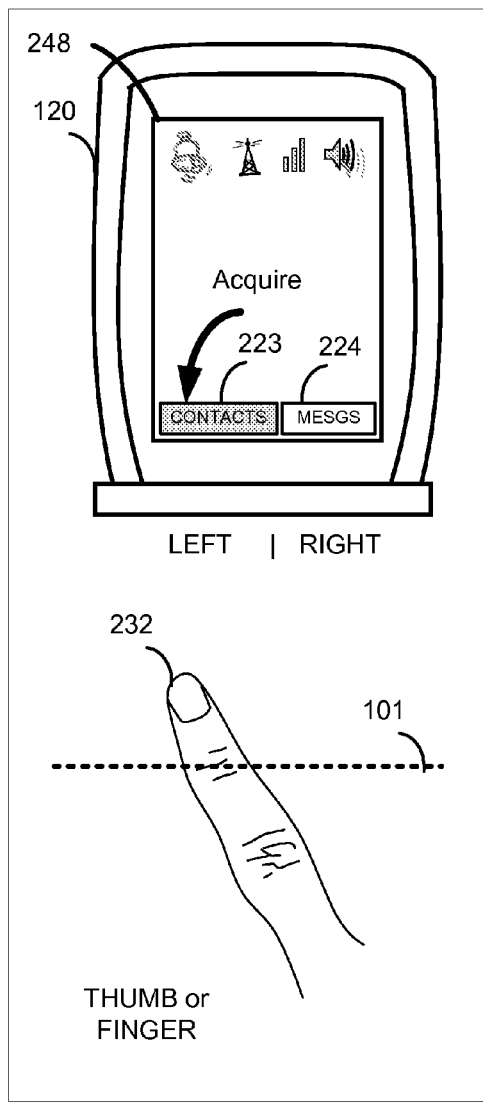
FIG. 13 is an illustration for acquiring a control in accordance with an embodiment of the inventive arrangements.
Figure 14:
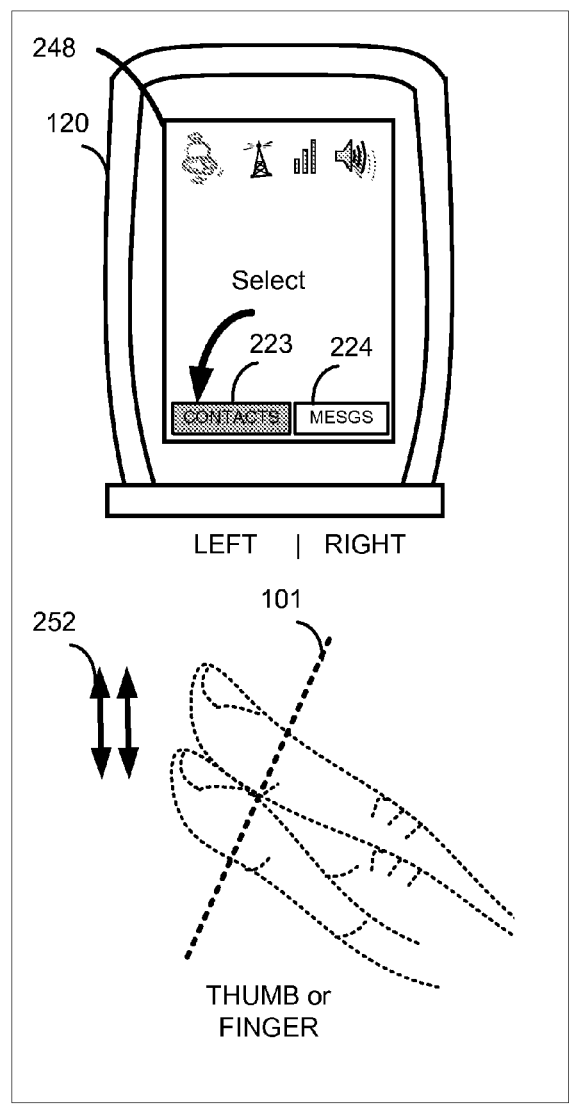
FIG. 14 is an illustration for selecting the control in accordance with an embodiment of the inventive arrangements.

For example, referring to FIG. 13, an illustration of a graphical user interface (GUI) is shown. The GUI 248 can be presented on the display 120 of the mobile device. Each location in the GUI can be associated with a finger location in the touchless sensory field 101. That is, the location is an absolute location such that a location of the finger in the touchless sensory field 101 is associated with a location of a control in the display. Accordingly, a finger moving in the touchless sensory field 101 can be associated with a control in the GUI 120. For example, the GUI may contain a contact control 223 or a message control 224. The contact control 223 and the message control 224 may open up more menus upon selection. In general use mode, a user can press a soft key on a keypad of the mobile device for selecting the contact control 223 or the message control 224. In touchless sensing mode, the user can point the finger to the left or the right to acquire the contact control 223 or the message control 224.

Returning back to FIG. 11B, at step 240, an indicator can be presented that the finger has acquired the control. In the illustration of FIG. 13, the control can be acquired when the finger points to the control. For example, the finger 232 points to the left to acquire the contact control 223 which may light up, or be visually enhanced in the GUI 248, to inform the user that the control has been acquired. Visually enhancing can include highlighting the control, flashing the control, changing a color of the control, or changing a descriptive attribute of the control, but is not limited to such. When a control has been acquired the control is locked. While the control remains locked, a second finger movement in the touchless sensory field 101 will not acquire a second control. For example, if the contacts control 223 is acquired, pointing to the right will not acquire the mesgs control 224. Notably, acquiring a control allows a user to continue moving the finger around without associating the finger movement with another control.

Returning back to FIG. 11B, at step 250, a finger movement at the approximate location can be identified for selecting the control. In particular, for location-centric control, the finger must be at a location that is approximately the same location when the finger acquired the control. That is, in order to select the control, the user must either leave the finger in the same location when it acquired the control, or, if the user moved the finger after acquiring control, the user must return the finger to the approximate location where the control was acquired. The location can also be a region. For example, if only a left 223 and right 224 control are presented, the location can correspond to the right region or the left region. That is, the user need only position the finger in the left region or the right region for selecting the control. For example, referring to FIG. 14, upon acquiring the contact control 223 (left region), the user can perform an up-down jitter finger movement in the right region for selecting the contact control 223. As more controls are added in the display, the touchless region for acquiring a controls decreases. Returning back to FIG. 11B, at step 260, a visual indicator can be presented that the finger has selected the control. For example, referring to FIG. 13, the contact control 223 can turn a solid color, flash, or proceed to present another GUI.

Figure 15:
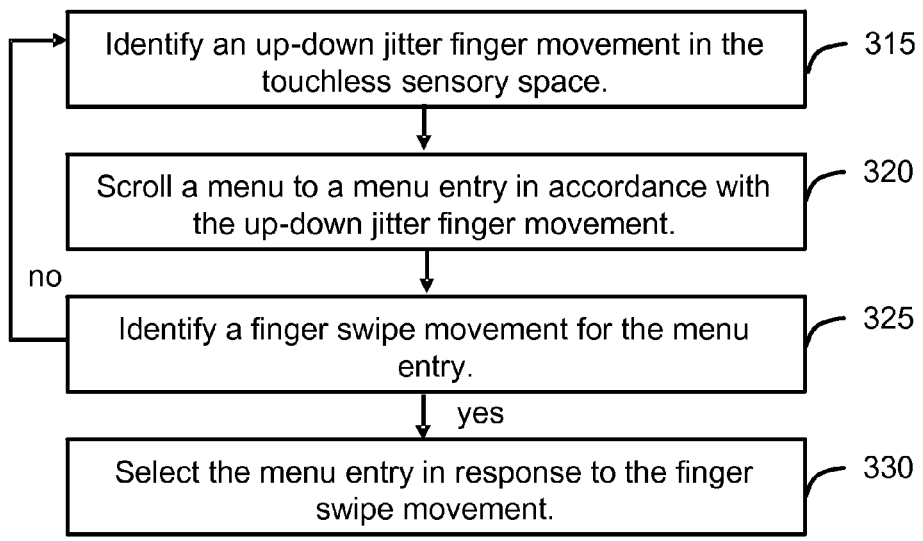
FIG. 15 is a first motion-centric method for scrolling in accordance with an embodiment of the inventive arrangements.

Referring to FIG. 15, a first method 310 for motion-centric touchless control is shown. The method 310 can be practiced with more or less than the number of steps shown. To describe the method 310, reference will be made to FIGS. 7, 16, and 17 although it is understood that the method 310 can be implemented in any other suitable device or system using other suitable components. Moreover, the method 310 is not limited to the order in which the steps are listed in the method 310 In addition, the method 310 can contain a greater or a fewer number of steps than those shown in FIG. 15. Briefly, the method 310 is for providing a touchless control for scrolling through a menu.

Figures 16, 17:
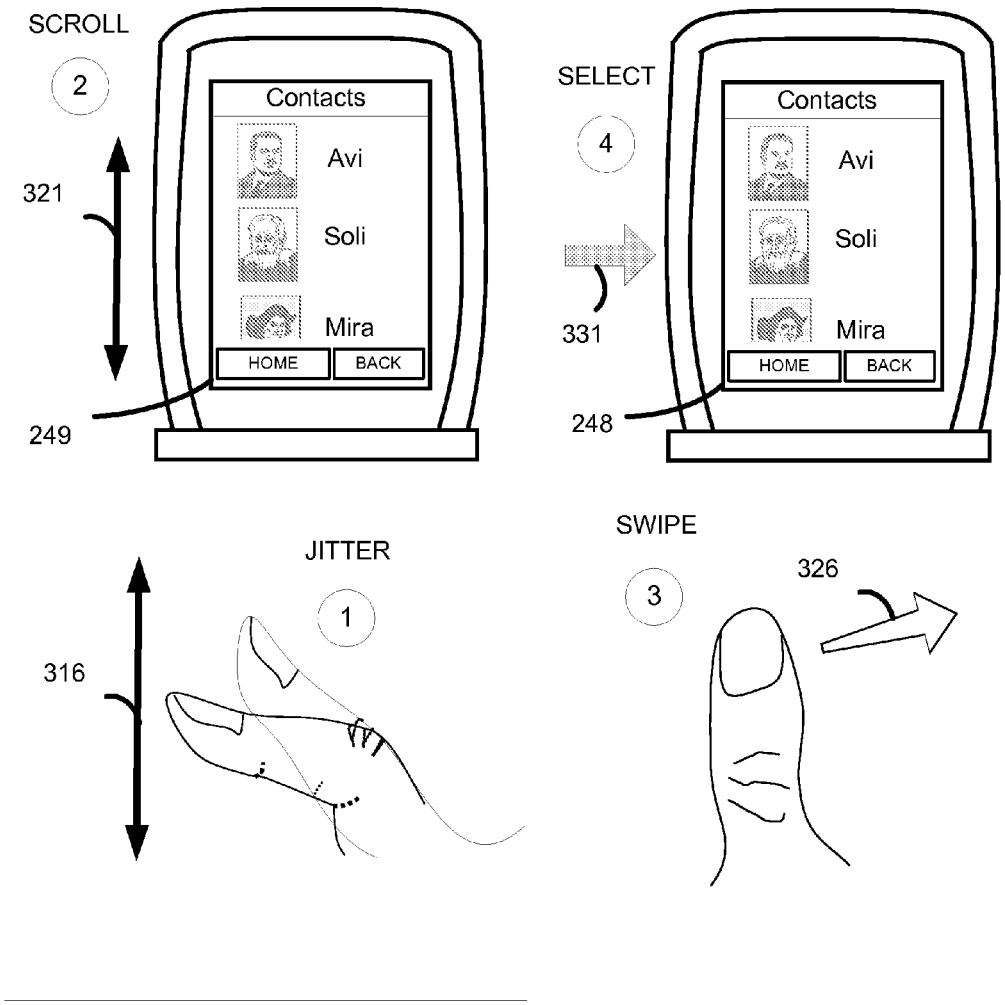
FIG. 16 is an illustration for scrolling a menu via up-down jitter finger movement in accordance with an embodiment of the inventive arrangements.
FIG. 17 is an illustration for selecting a menu entry using a finger swipe motion in accordance with an embodiment of the inventive arrangements.

At step 315, an up-down jitter finger movement can be identified in the touchless sensory space. For purposes of illustration, the method 310 can follow the location-centric method 225 of FIG. 11B. For example, upon selecting the contacts control 223 (See FIG. 14), the user can be presented a contacts menu 249 (See FIG. 16). Referring to FIG. 16, the user can perform an up-down jitter finger movement 316 upon display of the contacts menu 249. Briefly, referring back to FIG. 7, the processor 117 capable of tracking a location of the finger can recognize an up-down motion. In particular, the processor 117 can evaluate a history of locations and determine that the locations are repeated along a Y-axis of the virtual coordinate system 235 (See FIG. 12).

At step 320, a menu entry can be scrolled to in accordance with the up-down finger movement. For example, referring to FIG. 16, the processor 117 (See FIG. 7) can scroll 321 the contacts menu 321 in response to the up-down finger movement 116. In one arrangement, the contacts menu 321 may scroll at the same rate as the up-down 316 movement. In another arrangement, a rate can be selected for associating up-down finger movement 316 with scrolling 321 on the display to provide a user setting. Moreover, the scrolling 321 action may be delayed in response to the finger movement 316.

Returning to FIG. 15, at step 325, a finger swipe movement for a menu entry can be detected. For example, referring to FIG. 17, the user can perform an abrupt movement of the finger in a direction. This action corresponds to a finger swipe 326. For example, upon scrolling through the contacts menu 249, the user may identify an menu entry of interest. Accordingly, the user can perform a finger swipe 326 to select the menu entry. An abrupt movement is an accelerated movement that may be followed by a brief pause of the finger.

Figure 18:
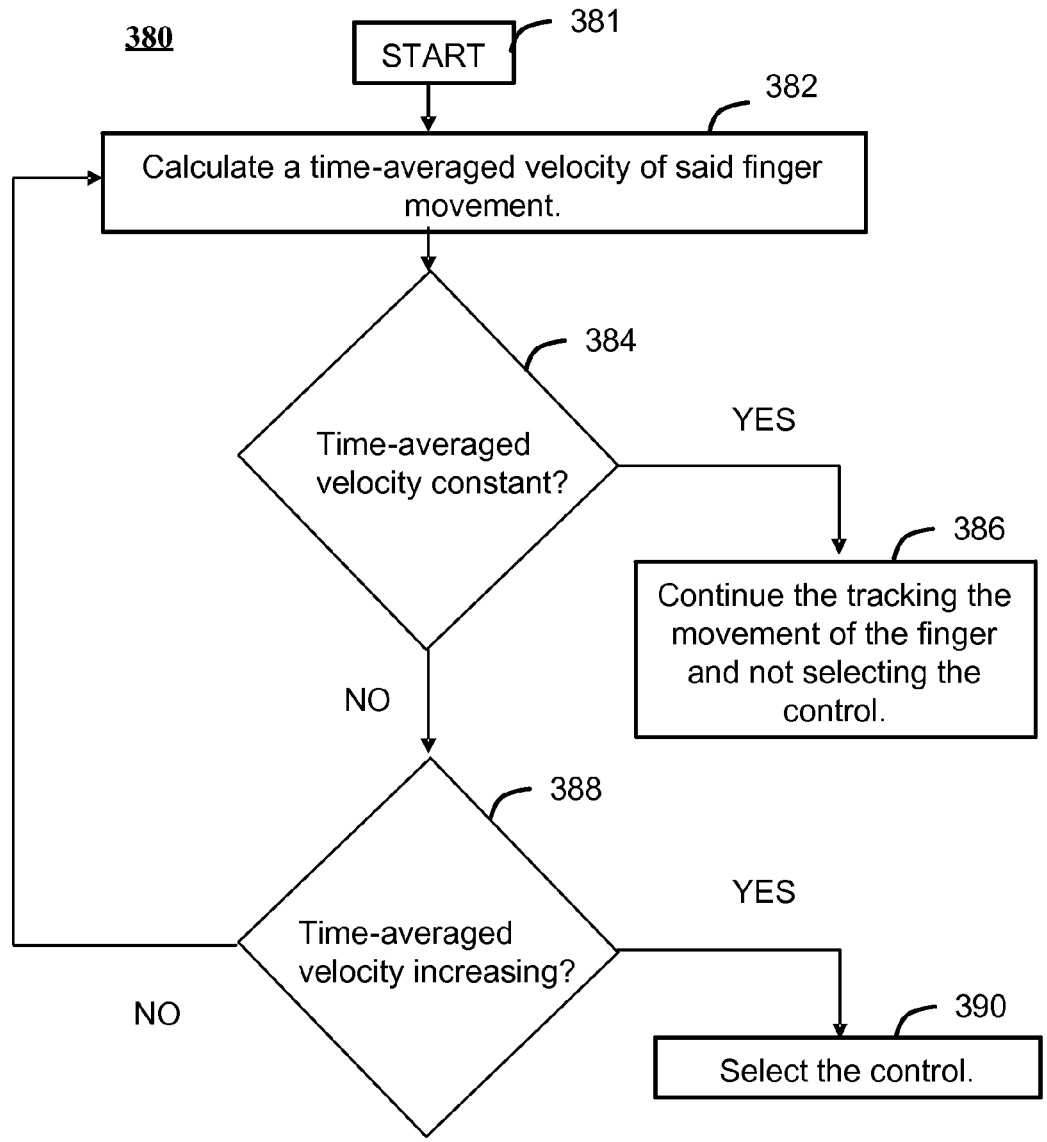
FIG. 18 is a method for detecting a finger swipe in accordance with an embodiment of the inventive arrangements.

Briefly referring to FIG. 18, a method 380 for calculating a finger acceleration is shown. At step 381, the method can start. At step 382, a time-averaged velocity of the finger movement can be calculated. At step 384, a determination can be made as to whether the time-averaged velocity is constant. If the time-averaged velocity is constant, at step 386, the tracking of the finger movement can continue and the control is not selected. If the time-averaged velocity is not constant, a second determination can be made at step 388. If the time-averaged velocity is increasing, at step 390, the control can be selected. If the time-averaged velocity is not increasing the method 380 can continue to monitor finger movement. For example, referring back to FIG. 7, the processor 117 can track a velocity of the finger by comparing locations over time. The processor 117 can then calculate a time-averaged velocity and the acceleration.

Returning to FIG. 15, at step 330, the menu entry can be selected in response to detecting the finger swipe movement. For example, referring to FIG. 17, upon performing the finger swipe movement 326, a menu entry 331 in the contacts menu 249 can be selected. Upon selecting the menu entry 331, an action may occur, another GUI may be presented, or any other response may be provided in accordance with selecting a menu entry.

Figure 19:
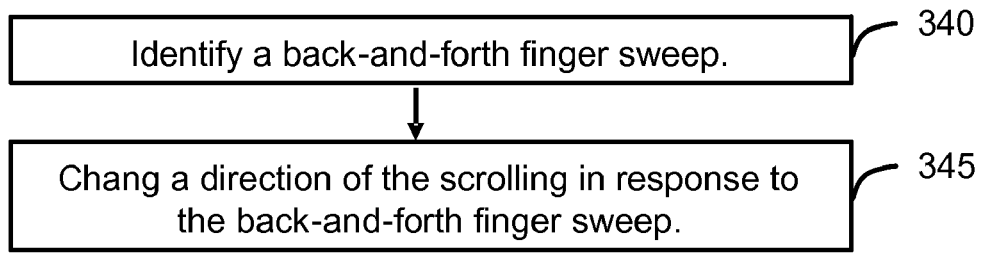
FIG. 19 is method for changing a scroll direction in accordance with an embodiment of the inventive arrangements.
Figure 20:
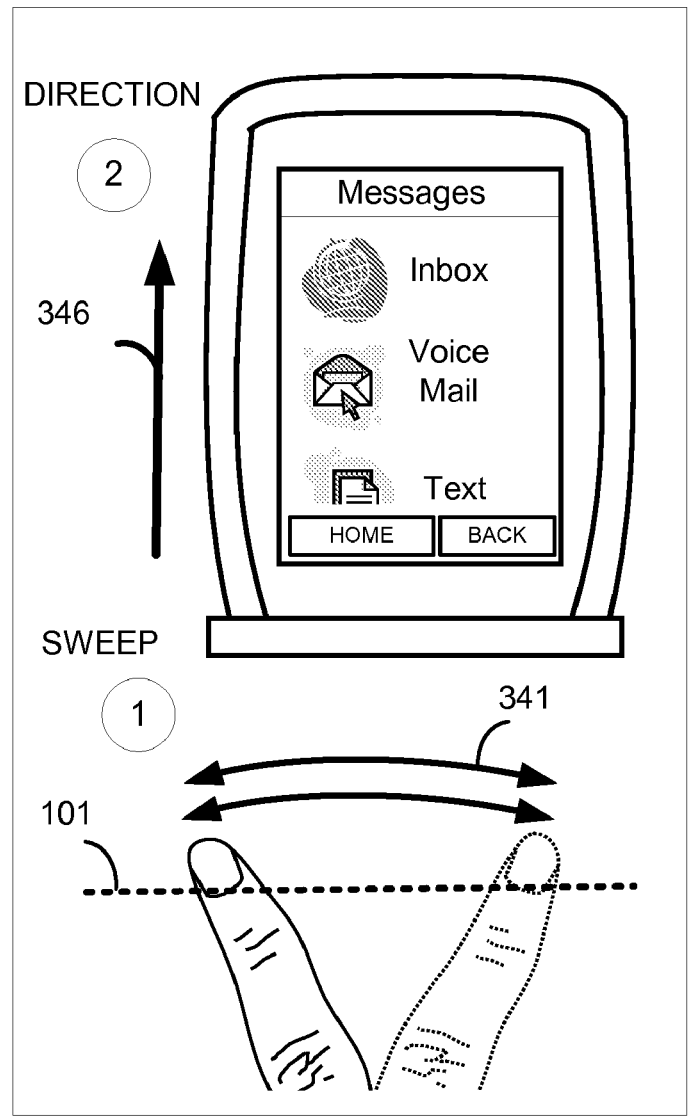
FIG. 20 is an illustration for changing a scroll direction via back-and-forth finger motion in accordance with an embodiment of the inventive arrangements.

In practice, referring still to FIG. 15, a user can scroll 321 through the menu 248 by performing up-down finger movements 316, and select 331 a menu entry by performing a finger swipe 326. The user may also change a direction of the scrolling. For example, referring to FIG. 19, at step 340, a back-and-forth movement can be detected. At step 345, a direction of scrolling can be changed in response to the back-and-forth finger sweep. Understandably, the touchless sensing unit 110 (See FIG. 7) can recognize certain finger movements such as up-down, left-right, which can include a broad back-and-forth sweeping movement. Referring back to FIG. 7, the processor 117 can assess whether a finger movement is a jitter movement or a sweep movement. In particular, a jitter is a brief localized movement that may correspond to one region of the display. In contrast, a broad sweep movement may span multiple regions. A region corresponds to an approximate location for acquiring or selecting a touchless control. Accordingly, the processor 117 can differentiate between jitter movements and sweep finger movements. Specifically, the processor 117 can evaluate the mapping between the virtual coordinate system 235 and the device coordinate system 237 (See FIG. 12) to associate the finger movements. Referring to FIG. 20, a back-and-forth sweep finger movement 341 is shown. The scrolling can change direction 346 in response to the back-and-forth sweep finger movement 341.

Figure 21:
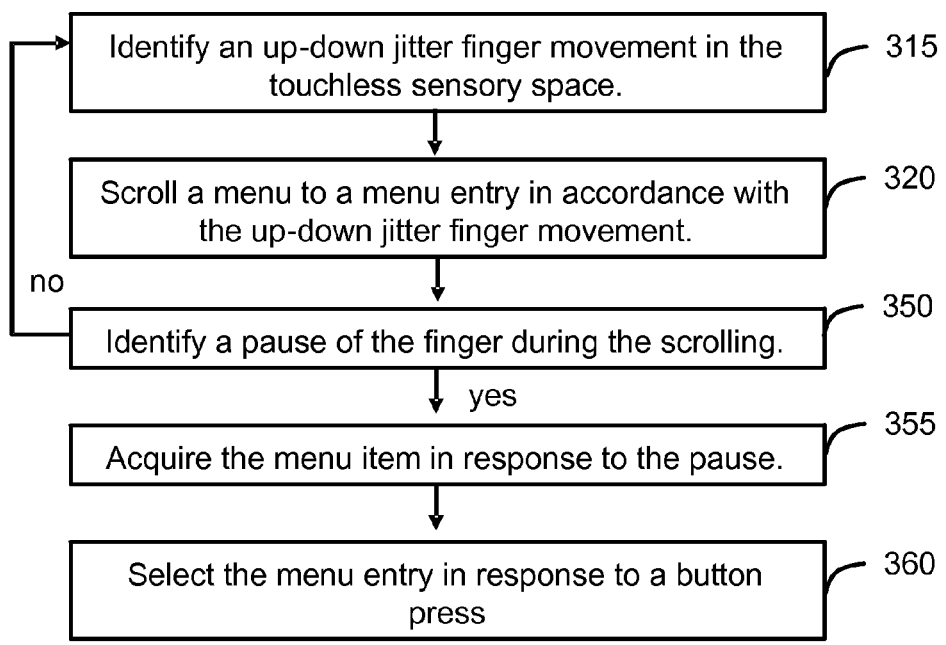
FIG. 21 is a first motion-centric method for scrolling in accordance with an embodiment of the inventive arrangements.

Referring to FIG. 21, a second method 311 for motion-centric touchless control is shown. Briefly, method 311 is an alternate means for selecting a menu entry as described in method 300 of FIG. 15. In particular, method steps 315 and 320 are identical to method 310 of FIG. 15 and are presented for completeness. The method 311 can be practiced with more or less than the number of steps shown. The method 311 is not limited to the order in which the steps are listed in the method 311 In addition, the method 311 can contain a greater or a fewer number of steps than those shown in FIG. 21

Figure 22:
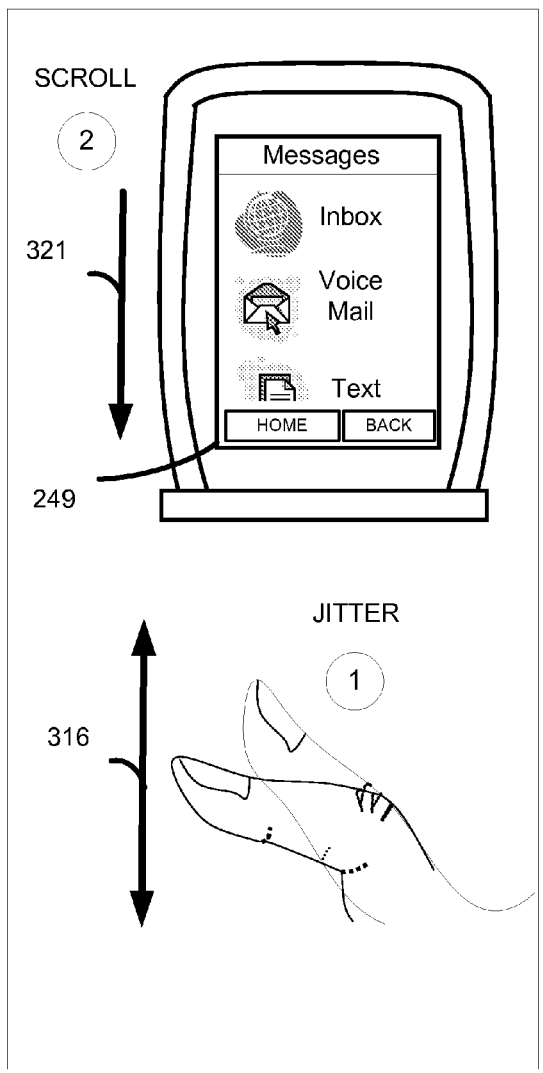
FIG. 22 is another illustration for scrolling via up-down jitter finger movement in accordance with an embodiment of the inventive arrangements.

At step 315, an up-down jitter finger movement can be identified in the touchless sensory space. At step 320, a menu entry can be scrolled to in accordance with the up-down finger movement. Referring to FIG. 22, the user can perform an up-down jitter finger movement 316 for scrolling 321 to the menu entry in the contacts menu 249.

Referring back to FIG. 21, at step 350, a pause of the finger can be detected. If a pause is detected, the method can continue to step 355. It a pause is not detected, the method 311 can continue monitoring for a pause in movement. At step 355, a menu entry can be acquired in response the pause. At step 360, the menu entry can be selected in response to a button press.

Figure 23:
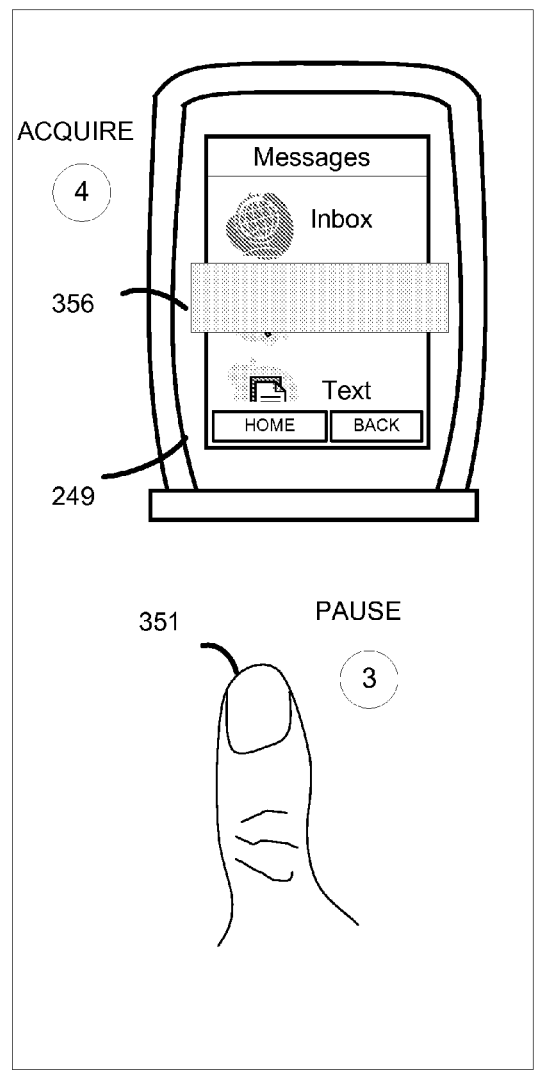
FIG. 23 is an illustration for acquiring a menu entry via a finger pause in accordance with an embodiment of the inventive arrangements.
Figure 24:
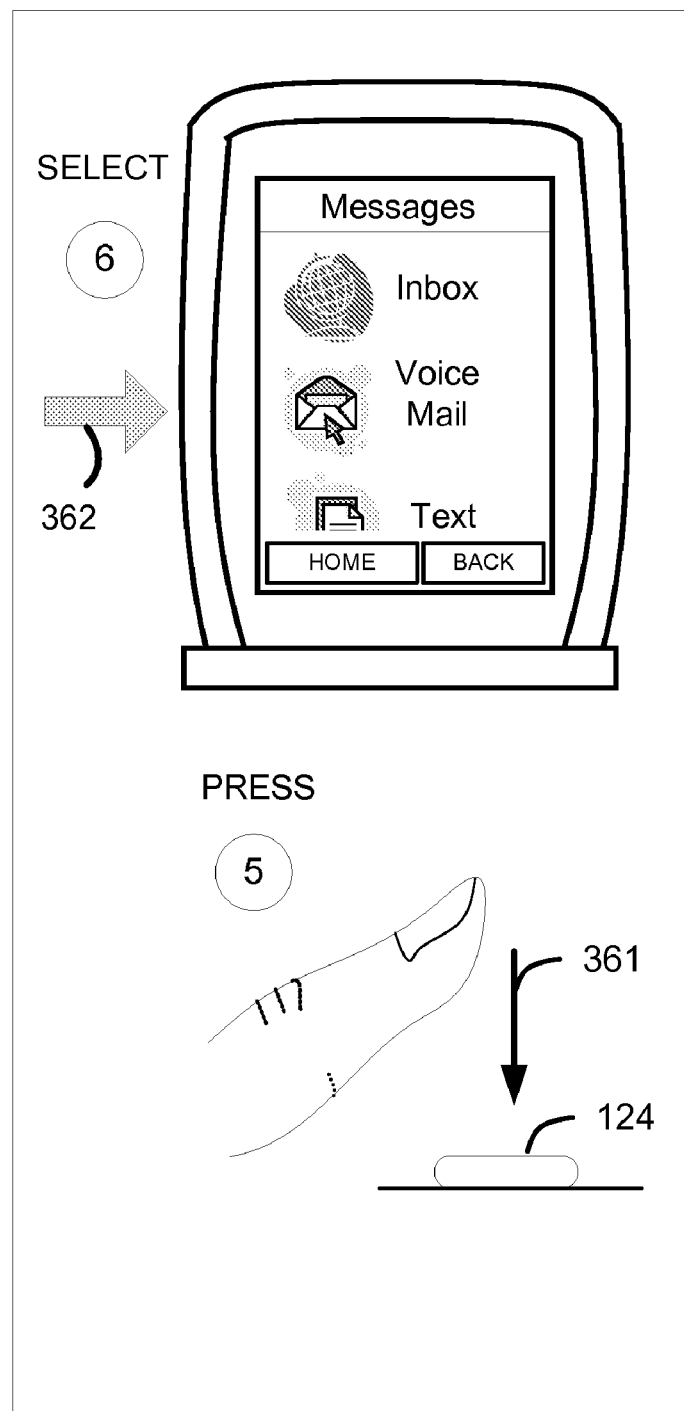
FIG. 24 is an illustration for selecting the menu entry via a button press in accordance with an embodiment of the inventive arrangements.

For example, referring to FIG. 23, the user can pause 351 the finger to acquire a menu entry 356. Notably, the menu entry may be visually enhanced for informing a user that the menu entry has been acquired. For example, the menu entry can flash or change color. Alternatively, a sound can be audibly played for informing the user the menu entry has been acquired. Referring to FIG. 24, upon acquiring the menu entry, the user can press 361 a key 124 on the mobile device. Upon pressing 361 the key, the menu entry can be selected 362. Briefly, upon acquire and detection of the pause, touchless control is effectively disabled as a result of the acquire. That is, the finger movement to press the button does not adjust a control.

Notably, the difference between motion-centric method 310 and 311 is the means by which the menu entry is selected. In method 310, the menu entry is selected via a finger swipe, which requires differentiation between a touchless up-down movement and a touchless accelerated movement. In method 311, the menu entry is selected by a combination of a finger pause and a button press, which requires only detection of touchless up-down movement. Accordingly, method 311 can be practiced as an alternative to method 310 if necessary. Moreover, certain users may prefer the single touchless up-down finger movement of method 311, instead of a touchless combination.

Referring to FIG. 25, another illustration for scrolling via touchless motion-centric control is shown. In particular, the user can perform a rotational finger movement 371 for scrolling 372 the menu list. Moreover, the direction of rotation corresponds to the direction of scrolling. For example, a clockwise rotational finger movement corresponds to down scrolling, and a counter-clockwise rotational finger movement corresponds to up scrolling. Moreover, a modulo scrolling can be performed such that a continued rotational finger movement restarts a scroll of the menu when an end of the menu is reached. Furthermore, a speed of the scrolling is a function of the rotational finger movement. That is, as the user rotates the finger faster, the scrolling increases, and as the user rotates the finger slower, the scrolling decreases. Briefly, referring back to FIG. 7, the processor 117 can track and store a history of the finger movement for determining whether a rotation has changed direction, or increased or decreased. The controller 118 can keep track of the control and determine when the scrolling has exceeded a modulo boundary for restarting scrolling.

In such regard, the user can scroll to a menu entry via rotational finger movement. A menu entry can then be selected in accordance with the finger swipe of method 300 or the combination pause and button press of method 311. Alternatively, the menu entry can be selected in response to an up-down finger movement 375 as shown in FIG. 26. The combination of the rotational finger movement 371 with the up-down movement 375 can be applied to acquire and select the menu entry. Notably, the sequence of finger movements can be selected as a function of the application. That is, different finger movements can be combined together for performing an acquire and select function, and are not limited to those shown in FIGS. 22-26.

Figure 27:
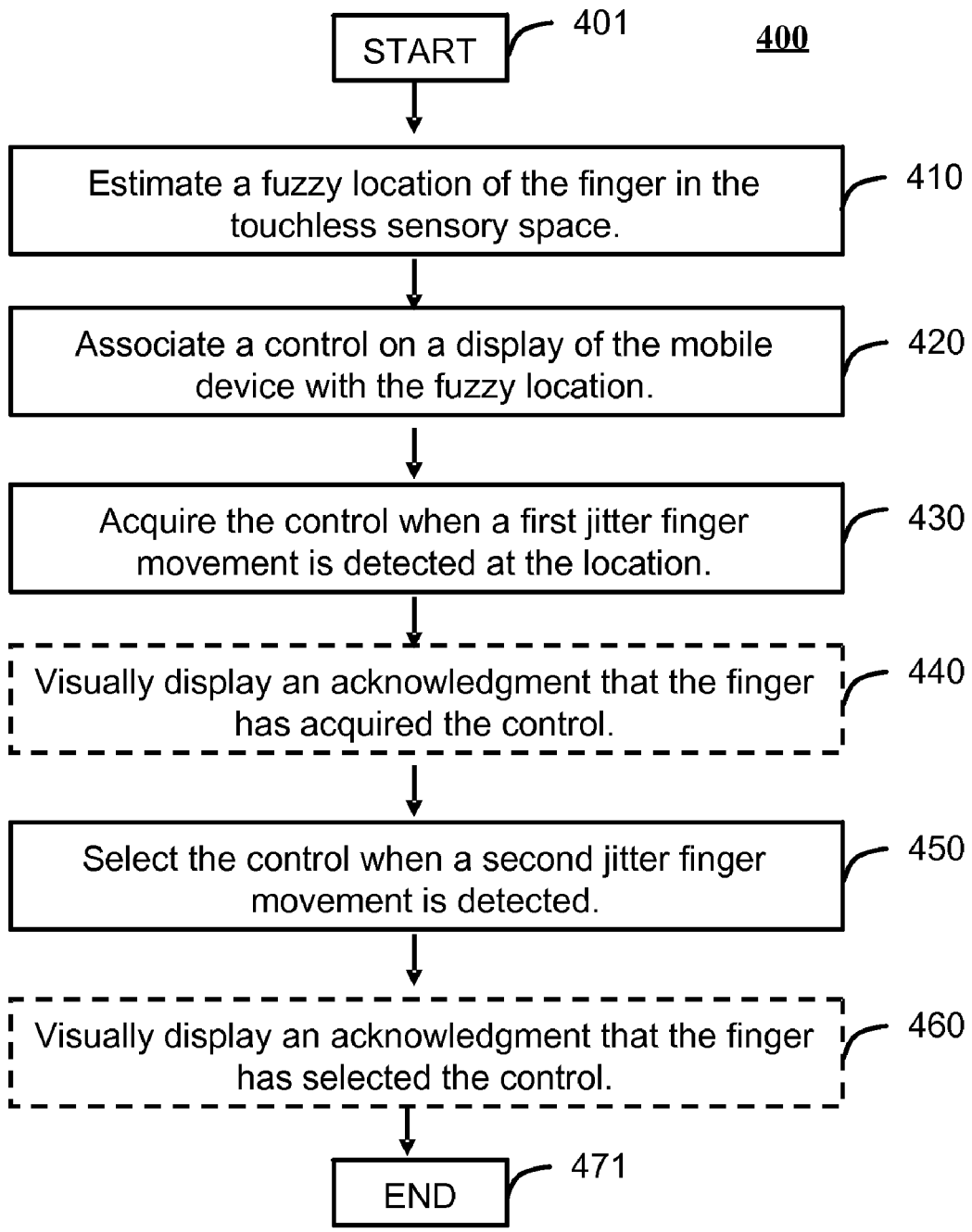
FIG. 27 is a method for location-centric touchless in accordance with an embodiment of the inventive arrangements.

Referring to FIG. 27, a location-centric method 400 for touchless control is shown. The method 400 can be practiced with more or less than the number of steps shown. To describe the method 400, reference will be made to FIGS. 7, 27 and 28 although it is understood that the method 400 can be practiced in other forms. Moreover, the method 400 is not limited to the order in which the steps are listed in the method 400 In addition, the method 400 can contain a greater or a fewer number of steps than those shown in FIG. 27.

Figure 28:
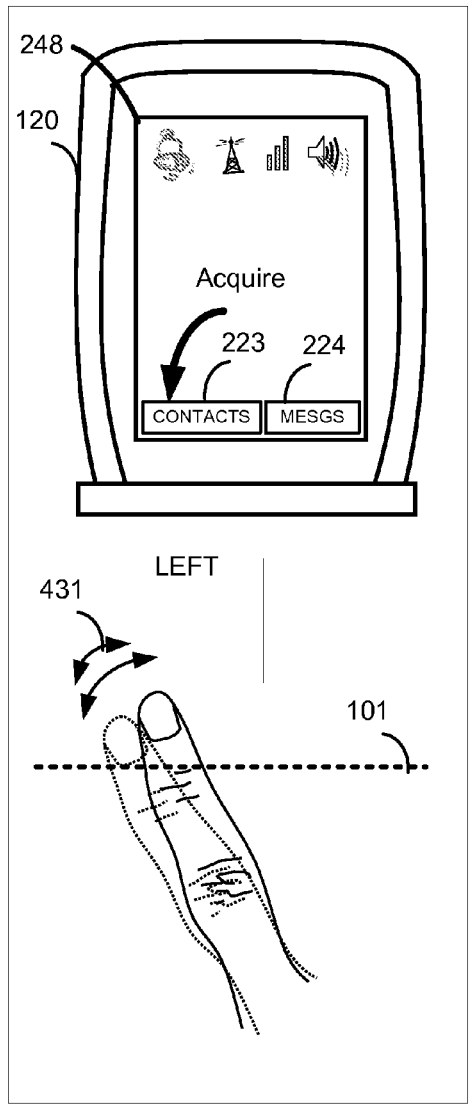
FIG. 28 is an illustration for acquiring a left control via left-right jitter finger movement in accordance with an embodiment of the inventive arrangements.

At step 410, a fuzzy location of the finger can be estimated in the touchless sensory space. A fuzzy location corresponds to a region such that a movement of the finger in the region is associated with a control in the display. For example a two-dimensional location may be specified by the absolute coordinate (x,y), whereas a fuzzy location may correspond to the coordinate (x±dx, y±dy). The fuzzy location corresponds to an approximate location of the finger. Briefly, referring back to FIG. 7, the processor 117 can introduce a variance in the location of the finger for providing the fuzzy range. The variation can be a fixed value or an adapted value, such as a statistical variance based on averages of previous finger locations. Referring to FIG. 28, an illustration of a left-right jitter movement 431 for acquiring a menu item is shown. In the example, the user has pointed to the left and performed a brief localized left-right movement of the finger to acquire the contacts control 223. Notably, because only two menu items are shown (e.g. contacts and mesgs) the fuzzy location corresponds to only one of two regions; the left, and the right. That is, an absolute location of the finger is not required. Moreover, a jitter movement is performed as an indication that an acquisition to a control is wanted. For example, if the user only points to the left, the menu item will not be acquire. The menu item will be acquired only when a jitter movement is detected. Notably, this prevents menu items from being accidentally acquired. For example, the user may desire to use keypad selection with touchless control. Accordingly, finger movement on the keypad may unintentionally acquire a menu item if jitter control is disabled. Accordingly, jitter control helps differentiate finger movement associated with other tasks with touchless control movements. Again, referring back to FIG. 7, the processor 117 can track finger locations to identify a jitter movement which can be recognized as a repeating pattern.

Returning back to FIG. 27, at step 420, a control on a display of the device can be associated with the fuzzy location. For example, referring to FIG. 28, the contacts control 223 in a user interface 248 of the display 120 can be associated with a jitter finger movement to the left, and the mesgs control 224 can be associated with a jitter finger movement to the right. That is each of the menu controls 223 and 224 can be associated with a fuzzy location. The jitter finger movement may be a left-right jitter or an up-down jitter. In the illustration of FIG. 28 the acquiring of contacts control 223 is associated with an up-down movement, for example. Again, referring back to FIG. 7, the controller 118, upon receiving an acknowledgement of a finger location from the processor 117, can send a command to the user interface 248 of the display 120 to associate the finger location with an object (e.g. control) on the display 120.

Returning back to FIG. 27, at step 430, the control can be acquired in response to detecting a first jitter finger movement at the location. A first jitter movement may be left-right movement briefly, method step 420 for associating a control, and method step 430 for acquiring control can be performed in the same step. At optional step 440, an acknowledgement can be visually displayed to indicate that the finger has acquired the control. Again, referring back to FIG. 7, the controller 118, upon receiving an acknowledgement of a first movement from the processor 117, can send a command to the user interface 248 of the display 120 to acquire the object (e.g. control) on the display 120. In response, the user interface 248 can present an indicator that the control has been acquired, such as a highlighting of the contacts control 223. Alternatively, a sound can be presented. The acquiring locks the control, such that while the control remains locked, a second jitter finger movement in the touchless sensory space does not acquire a second control. Notably, this allows the user to perform some other task such as typing at keypad or evaluating other menu options via they keypad. Once the control is acquired, the touchless sensing unit 110 (See FIG. 7) awaits a second finger movement for selecting the command.

Referring to FIG. 28 an illustration for acquiring a left control is shown. For example, the user can acquire the contacts control 223 by issuing a left-right finger movement 431. The contacts control 223 entry in the display can flash or change color to indicate the contacts control 223 has been acquired.

Returning back to FIG. 27, at step 450, the control can be selected in response to a second jitter finger movement. A second jitter finger movement may be an up-down movement which is distinct from the left-right movement of the first finger movement. At step optional 460, acknowledgement can be visually displayed to indicate that the finger has acquired the control. Alternatively, a sound can be presented. Again, referring back to FIG. 7, the processor 117 can differentiate between the first finger movement and the second finger movement. The controller 118, upon receiving an acknowledgement of a second finger movement from the processor 117, can send a command to the user interface 248 of the display 120 to select the object (e.g. control) on the display 120.

Figure 29:
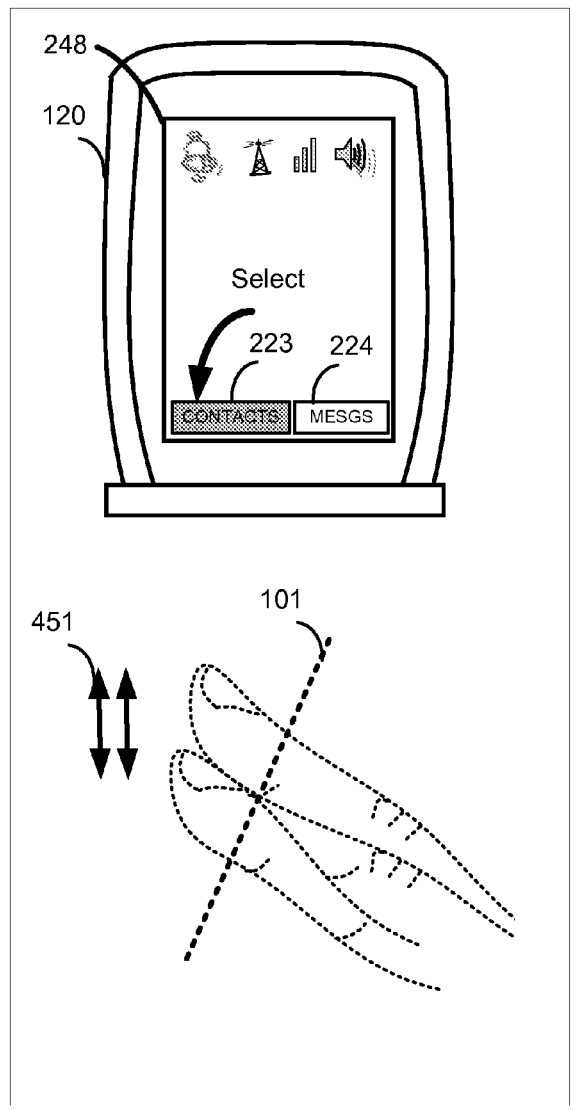
FIG. 29 is an illustration for selecting the left control via up-down jitter finger movement in accordance with an embodiment of the inventive arrangements.

Referring to FIG. 29, an illustration for selecting an acquired control is shown. Briefly, the contacts control 223 was acquired from the left-right finger movement 431 performed by the user as shown in FIG. 28. Upon acquire, the user can then issue an up-down finger movement 451 to select the contacts control 223. The contacts control 223 can flash or change color to indicate a selection has been made. Or, another menu list can be presented in response to the selection. Notably, other means for visually or auditorily indicating a completion of an acquire or select command. Returning back to FIG. 27, at step 471, the method 400 can end.

Referring to FIGS. 30 and 31, two illustrations for acquiring and selecting a right control is shown. Notably, the methods for acquire and select are the same as FIG. 28, except the right menu has been acquired and selected instead of the left menu. In particular, the user acquires the mesgs control 224 by issuing a left-right finger movement 453. The mesgs control 224 entry in the display can flash or change color to indicate the mesgs control 224 has been acquired. Upon acquire, the user can issue a up-down finger movement 454 to select the mesgs control 224. The mesgs control 224 can flash or change color to indicate a selection. Or, another menu list can be presented in response to the selection. Notably, other means for visually or auditorily indicating a completion of an acquire or select command.

In another arrangement, the combination of a left-right movement followed by a up-down movement can be interchanged. That is, the user can perform a up-down movement followed by a left-right movement for acquiring and selecting the controls, respectively. In yet another arrangement, a first up-down jitter finger movement, followed by a pause, and then a second up-down jitter finger movement can be identified for acquiring and selecting the control, respectively. Similarly, a visual or audio indicator can be presented each for the acquiring and the selecting.

Figure 32:
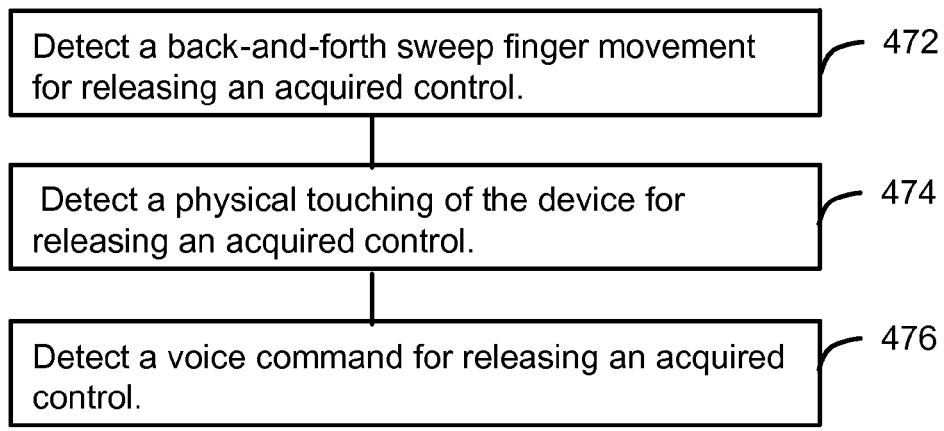
FIG. 32 is a set of methods for releasing an acquired control in accordance with an embodiment of the inventive arrangements.

Referring to FIG. 32, a set of commands 470 for releasing an acquired control is presented. Notably, the set of commands are independent and are not practiced together in any order. A user can perform any of the commands presented to release an acquired control. A user may wish to release an acquired control for various reasons. For one, the user may have made an incorrect entry. Releasing an acquired control resets the combinational acquire and select approach for touchless control. That is, upon releasing an acquired control, the user can start over again.

At block 472, an acquired control can be released by detecting a back and forth sweep finger movement. Again, referring back to FIG. 7, the processor 117 can track a location of the finger movement and determine when a finger movement corresponds to a broad sweeping motion. The controller 118 can then release the acquired control. For example, the controller 118 upon receiving indication that a back-forth motion was detected, can send a message to a GUI of the mobile device to release the handle to the object in the display. For example, referring back to FIG. 28, the GUI 248 can convert the color of the menu control 223 back to a default color prior to acquisition or prevent the menu control 223 from flashing.

At block 472, an acquired control can be released by detecting a physical can be communicatively connected to a keypad of the mobile device. Upon receiving an indication that a key has been depressed, the controller 118 can send a command to release control. For example, referring back to FIG. 28, the GUI 248 can convert one or more descriptive attributes of the menu control 223 to a default attribute.

Figure 33:
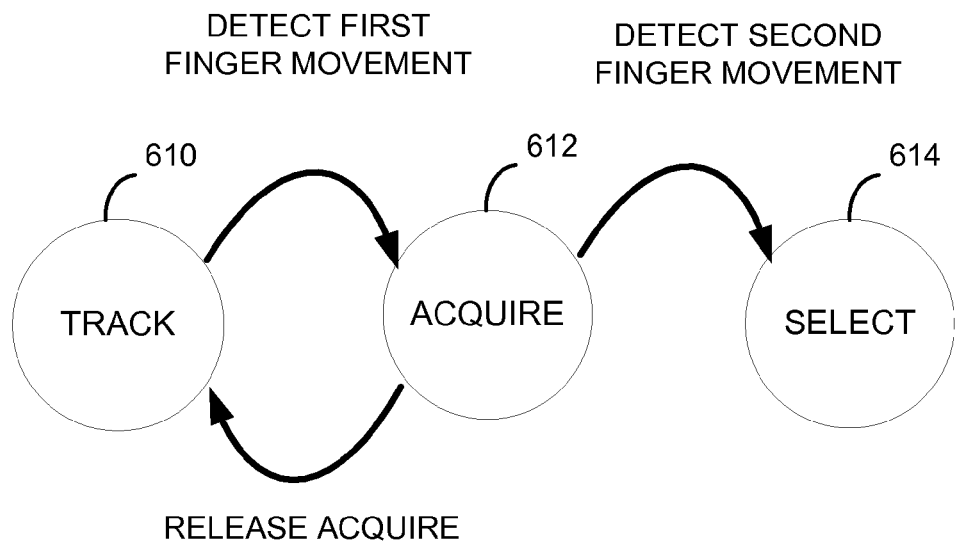
FIG. 33 is a state diagram for acquiring and selecting a control in accordance with an embodiment of the inventive arrangements.

At step 476, an acquired control can be released by detecting a voice command. Again, referring back to FIG. 7, the processor 117 can be operatively coupled to a voice recognition system that can listen for commands. In particular, the voice recognition system can be activated immediately after a control has been acquired but before it has been selected to give a user an opportunity to release the acquired control. For example, upon acquiring a command, the processor 117 can enable voice recognition. A user can say a word or phrase, such as "no", to inform the processor to release the acquired control. The "no" will be immediately associated with releasing the acquired command. Referring back to FIG. 28, the GUI 248 can convert one or more descriptive attributes of the menu control 224 to a default attribute in response to a voice command, Briefly referring to FIG. 33, a state diagram 600 illustrating the acquire and select approach for touchless control is shown. In particular, the state logic can start in a tracking state 610, wherein the touchless sensing unit 110 (See FIG. 3) tracks a location or movement of a finger. Upon detecting a first finger movement for a control, the state can enter an acquire state 612. During acquire state, the control is locked. During lock, only a second finger movement or a release command can exit the locked state. A second finger movement may be a particular finger movement such as an up-down jitter, or a swipe, but is not limited to such. Again, referring back to FIG. 7, the processor 117 can include the state logic 600 that allows it to recognize an acquire state and a select state. Notably, the state diagram 600 can be programmed with different finger movements for different application. If a second finger movement is detected, that corresponds to an authorized finger movement, the state logic can proceed to the select state 614 wherein the control has been selected. At this state, control has been granted to the user. If a release command is identified, such as 472, 474, or 476 of FIG. 32, the state diagram can return to the tracking state 610. In this case, the acquired control has been released and tracking for a first finger movement is restarted. Notably, releasing an acquired command is associated with resetting the state logic.

Figure 34:
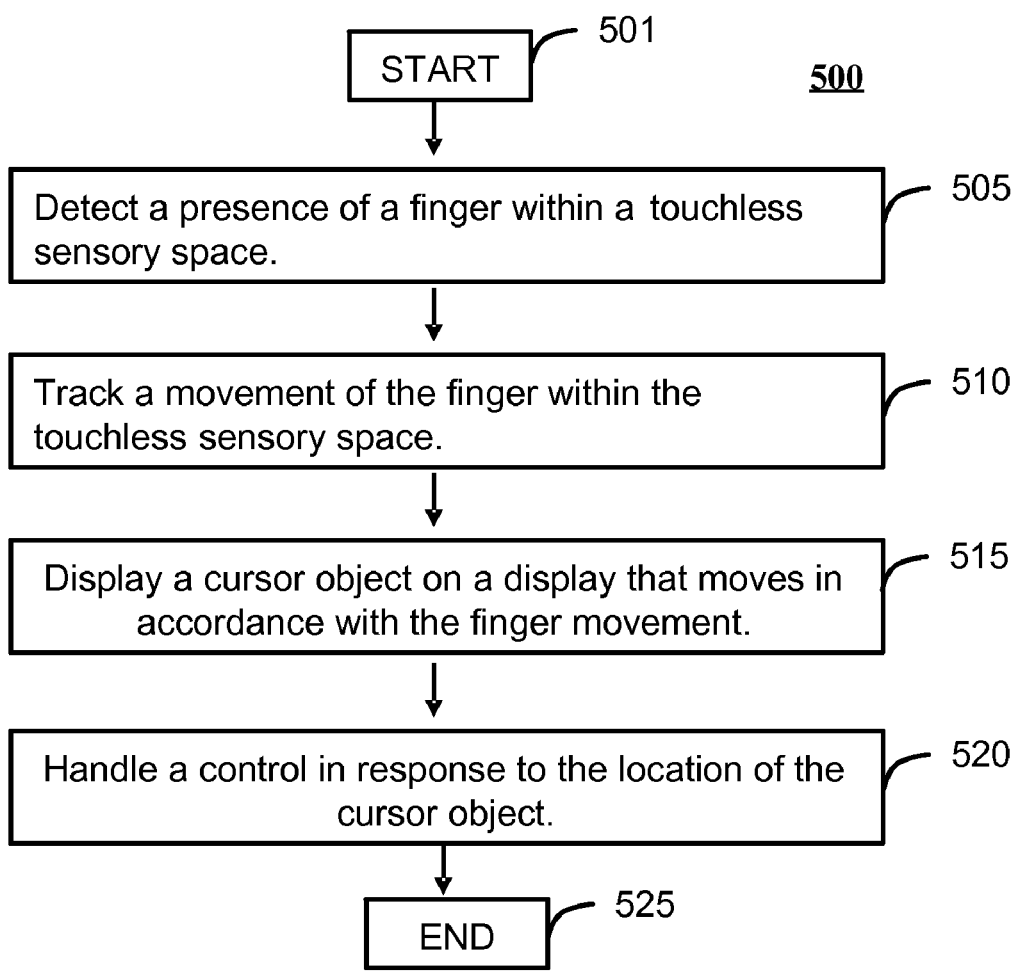
FIG. 34 is a location-centric method for touchless entry in accordance with an embodiment of the inventive arrangements.

Referring to FIG. 34, a method 500 for touchless entry is shown. The method 400 can be practiced with more or less than the number of steps shown. To describe the method 500, reference will be made to FIGS. 7, 18, and 33-36 although it is understood that the method 500 can be implemented in any other suitable device or system or form using other suitable components. Moreover, the method 500 is not limited to the order in which the steps are listed in the method 500 In addition, the method 500 can contain a greater or a fewer number of steps than those shown in FIG. 32.

At step 501, the method 500 can start. At step 505, a presence of a finger can be detected within a touchless sensory space. For example, referring back to FIG. 7, the processor 117 of the touchless sensing unit 110 detects echo signals reflected off a finger. The receivers 121 and 141 can monitor a signal level of a return echo. The processor 117 can determine if the signal strength of the return signals exceed a threshold. If a threshold is exceeded, the processor 117 can confirm the presence of an object, such as a finger.

Figure 35:
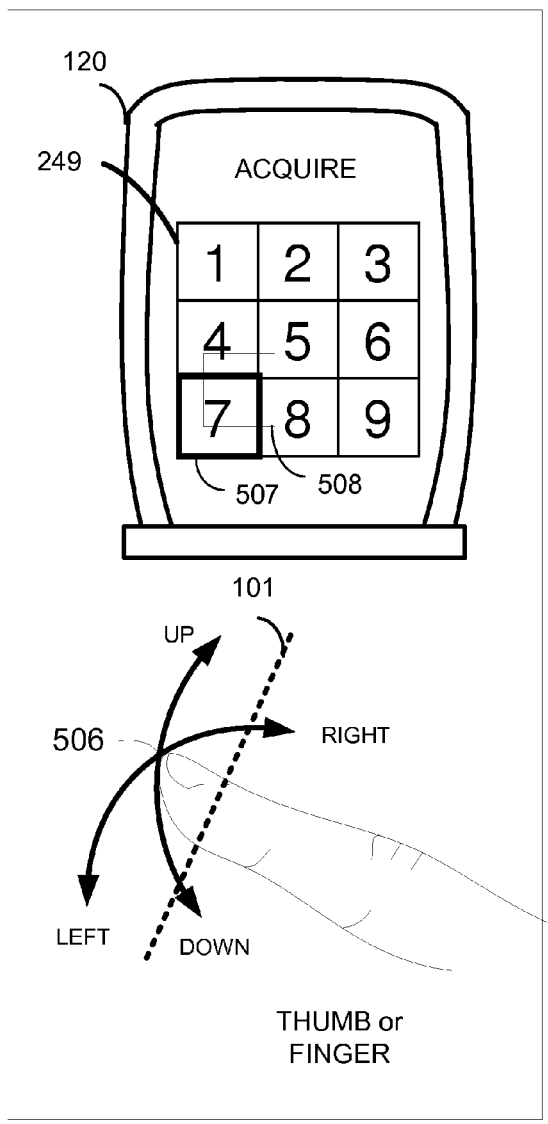
FIG. 35 is an illustration for navigating a cursor object in accordance with an embodiment of the inventive arrangements.

At step 510, a movement of the finger can be tracked within the touchless sensory space. For example, referring back to FIG. 7, the processor 117 of the touchless sensing unit 110 can identify a location of the finger based on a plurality of echo returns reflecting off of the finger. The processor 117 can store the locations over time and track the movement of the finger. Notably, the processor can include logic gates, memories, delays, counters, timers, to identify and track the movement of the finger. Referring to FIG. 35, the touchless sensing unit 110 (not shown) can track a location and movement of the finger 506 in any direction when the finger is in the touchless sensing field 101.

Returning back to FIG. 34, at step 515, a cursor object can be displayed that moves in accordance with the movement. For example, referring to FIG. 35, the cursor object 508 can be a translucent text box that moves in accordance with a movement of the finger 506. The cursor object 508 can be a free floating icon, a cursor, an avatar, a translucent text box, or a zoom window or any other suitable object and is not limited to those presented. Briefly, referring back to FIG. 7, the controller 118 receives finger location information from the processor 117. The controller 118 can send the location information to a device driver of the mobile device 100 presenting the display 120. The device driver can interpret the location information and move the cursor object 508 in accordance with the finger movement. In one arrangement, the controller 118 may present the location information as absolute coordinates or differential coordinates. Moreover, the controller 118 may use a PS/2 or USB interface to communicate the coordinates to the mobile device.

Returning to FIG. 34, at step 515, a control can be handled in response to a location of the cursor object. In particular, a control in the display can be associated with the finger when the cursor object is over the control. For example, referring to FIG. 35, the cursor object 508 will move around the display 120 in accordance with the finger movement 506. The display may contain a user interface 249. When the cursor object is moved over a control 507, the control 507 becomes associated with the finger. An acknowledgement that the control has been associated can also be presented. For example, the control 507 can blink, flash, change colors, when the cursor object 508 associates the control 507. In one arrangement, the cursor object can associate the control when a majority of the surface area of the transparent text box covers a control. In this manner, at least one control will always be associated. This also corresponds to when the center of the cursor object 508 is over a control 507.

It should be noted, that the association of the control 507 to the finger movement 508 is not the same as acquiring the control with regard to method 225. During an acquire, the control is locked. In method 500 for touchless entry, a control is associated, which is different from being acquired. With regard to method 500, during association, the control is not locked. That is, moving the finger will cause another control to be associated with a new location of the finger. If the finger moves to a new control, the new control is associated.

Returning to FIG. 34, at step 520, a control can be handled in response to the location of the cursor object. For example, referring to FIG. 36, the control 507 can be selected when the cursor object 508 is over the control 507 and a finger swipe 543 is performed. In this case handling the control is the selecting of the control in response to the finger swipe 543. Notably, the finger swipe 543 is one means for selecting the control which is discussed ahead in FIG. 37. For example, other finger movements such as an up-down movement can be performed to select the control. At step 525, the method 500 can end.

Figure 36:
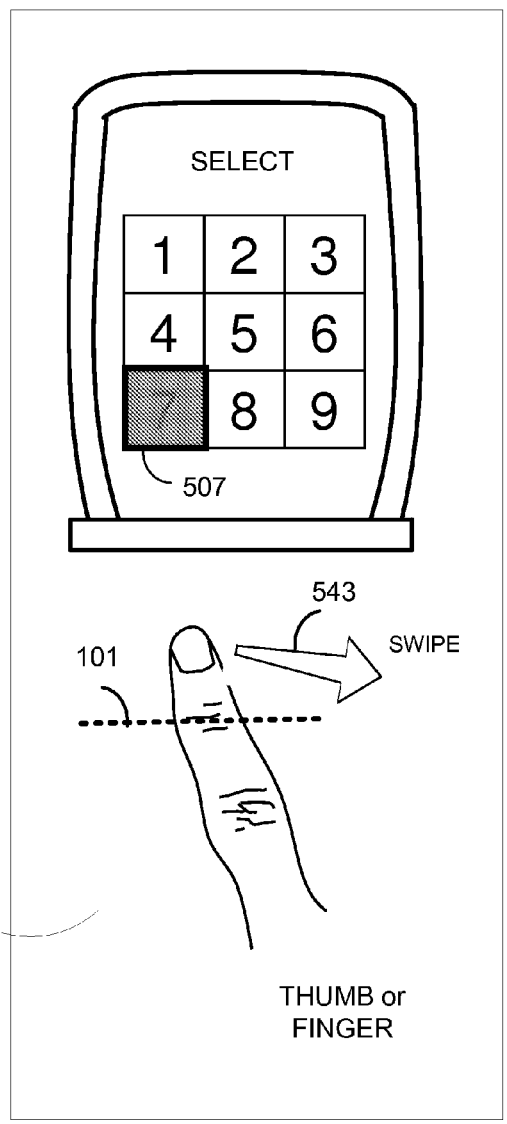
FIG. 36 is an illustration for selecting an object using the cursor object in accordance with an embodiment of the inventive arrangements.
Figure 37:
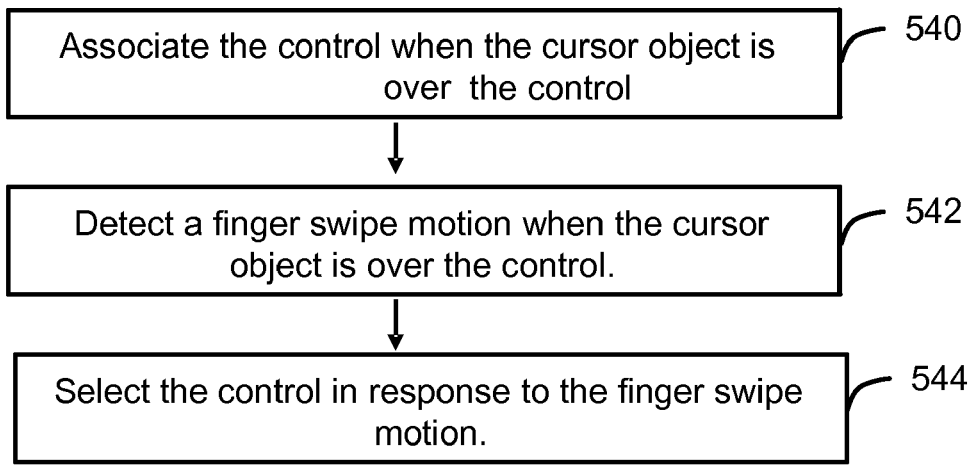
FIG. 37 is a first method for acquiring and selecting a touchless entry in accordance with an embodiment of the inventive arrangement.
Figure 38:
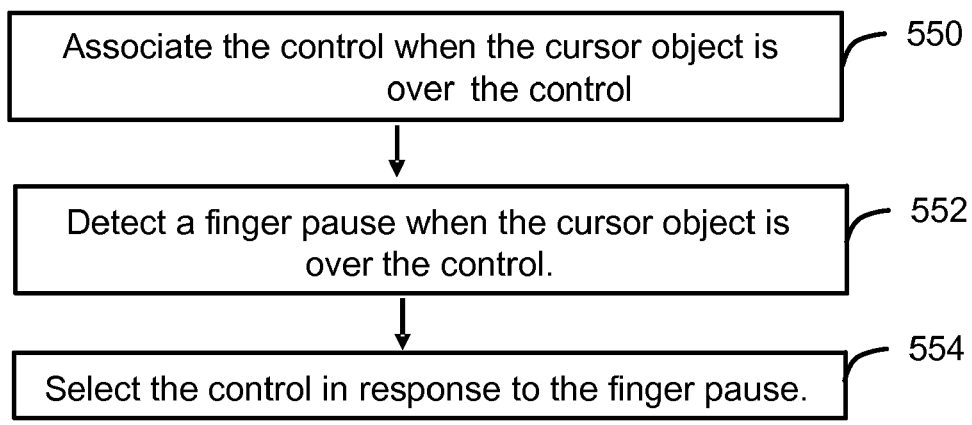
FIG. 38 is a second method for acquiring and selecting a touchless entry in accordance with an embodiment of the inventive arrangements.

Referring to FIG. 37, a first method for handling control is shown. The method may be practiced with more or less than the number of steps shown. The first method is a particular implementation of method 500 of FIG. 34. At step 540, the control can be associated when the cursor object is over the control. At step 542, a finger swipe motion can be detected when the cursor object is over the control. At step 544, the control can be selected in response to the finger swipe movement. For example, referring back to FIG. 35, the control 507 is associated with the finger when the finger is in a region corresponding to the control. Upon associating a control, the user can select the control by performing a finger movement. Referring to FIG. 36, a finger movement may be a finger swipe or a jitter movement but is not limited to such. In this example, a user, upon moving the finger to position the cursor object 508 over a control 507, can select the control by performing an abrupt and accelerating finger movement; that is, a swipe. Briefly referring back, to FIG. 7 the processor 117 can evaluate the finger movement and calculate an acceleration of the finger for recognizing a finger swipe in accordance with method 280 as shown in FIG. 18.

Referring to FIG. 37, a second method for handling control is shown. The method may be practiced with more or less than the number of steps shown. The first method is a particular implementation of method 500 of FIG. 34. At step 550, the control can be associated when the cursor object is over the control. At step 552, a finger pause can be detected when the cursor object is over the control. At step 554, the control can be selected in response to the pause. For example, referring back to FIG. 33, the control 507 is associated with the finger when the finger is in a region corresponding to the control. Upon associating a control, the user can pause the finger to select the control. In such regard, a second finger movement is not required. That is, the control is selected when a pause in finger movement is detected. The pause may by between 100 ms and 1 second. Briefly referring back, to FIG. 7 the processor 117 can include a timer and counter to evaluate the time a finger is at a same location. If the processor 117 determines that the time exceeds a predetermined threshold, the controller 118 then select the control. Upon selecting the control, a visual or auditory indicator can be presented. As an example, the application 249 may be a telephone dialing. A user can repeat the steps of selecting a control for entering a phone number, entering a text message, entering a numeric code, or an alpha-numeric message. Accordingly, a user can dial a sequence of numbers by holding a finger over each number and either pausing the finger in accordance with method step 552 of perform a finger swipe in accordance with method step 542. In this manner, a user can enter a sequence of numbers via touchless control.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A touchless user interface integrated with a portable device, comprising:
    a touchless sensing unit arranged external to a display of the device and integrated thereon for
        generating an ultrasonic touchless sensory space projected one inch or more above and wider than a dimension of the display, and
        tracking a three-dimensional finger movement that projects forward and retracts backward one inch or more above the display in the touchless sensory space by pulse-echo detection of reflected ultrasonic signals; and
    a control unit for
        calibrating a tracking of the finger or object movement from forward projecting and backward retracting movement along a principal axis of the ultrasonic touchless sensory space;
        mapping a virtual coordinate system of the touchless sensory space in three-dimensions to a two-dimensional display coordinate system of the device according to the calibrating along the principal axis;
        associating at least one forward projecting and backward retracting finger or object movement in the virtual coordinate system with a control action of a user interface component in the display coordinate system, and
        adjusting at least one control of the device in response to the finger movement according to the mapping,
    wherein said control action is an acquire, a select, or a release, and the calibrating compensates for a three-dimensional sweeping range of the finger movement in the touchless sensory space to an absolute range of locations in the device coordinate system.

2. The touchless user interface of claim 1, wherein the control unit identifies a movement of the finger in a region of the touchless sensory space, associates the movement with a control on a display of the device, and performs a control action on the control in response to the movement according to a state machine with a selection lock, wherein the state machine
    acquires the control upon detecting a first movement;
    assigns the lock to the control upon completion of the first movement; and
    selects the control upon detecting a second movement if the control has the lock,
    where continued touchless control is granted to acquire other controls during the lock but prevent a selection of the other controls until the lock is thereto assigned.

3. The touchless user interface of claim 2, wherein the control unit identifies a left-right jitter movement along a different principal axis and performs left-right calibration there along, and associates the left-right jitter movement with a control,
  wherein a second left-right jitter movement to a left region acquires a left control to produce an acquired left control, or the second left-right jitter movement to a right region acquires a right control to produce an acquired right control.

4. The touchless user interface of claim 2, wherein the control unit identifies an up-down jitter movement of the finger along a different principal axis and performs up-down calibration there along, and associates the up-down jitter movement with a control,
  wherein a second up-down jitter movement to the left region selects an acquired left control, or the second up-down jitter to the right region selects an acquired right control.

5. The touchless user interface of claim 1, wherein the control unit identifies an up-down jitter finger movement in the touchless sensory space, associates the up-down jitter finger movement with a scrolling of a menu on a display of the device, and performs a scrolling of the menu in response to the up-down jitter finger movement.

6. The touchless user interface of claim 2, wherein the control unit identifies a rotational finger movement in the touchless sensory space, associates the rotational finger movement with a scrolling of a menu on a display of the device, and performs a scrolling of the menu in response to the rotational movement.

7. The touchless user interface of claim 6, wherein a clockwise rotational finger movement corresponds to a down scroll, and a counter-clockwise rotational finger movement corresponds to an up scroll.

8. The touchless user interface of claim 1, wherein the control is one of a voice mail control, an email control, a display control, a game control, a contact list, an audio control, a camera control, a security control, or a telephone control.

9. The touchless user interface of claim 1, wherein the control unit differentiates between the presence of a thumb or a finger in the touchless sensory field for associating the control.

10. The touchless user interface of claim 1, wherein the device is a cell phone, a radio, a portable music player, a personal digital assistant, a portable memory module, a portable personal identifier device, a hand-held game, or a hand-held electronic security device.

11. The touchless user interface of claim 1, further comprising a button communicatively coupled to the controller, wherein the controller
  detects a button press; and
  grants touchless control in response to the button press.

12. The touchless user interface of claim 1, wherein the button is associated with a control attribute, and the touchless control is associated with a value of the control attribute.

13. The touchless user interface of claim 1, further comprising at least one button communicatively coupled to the controller, wherein the controller
  detects a first button press;
  determines if the first button press is held down within a time duration,
  if the button press is held down within the time duration, grants touchless control of the device, else,
  if the button press is held down longer than the time duration,
    initiates a calibration of the device for touchless sensing responsive to recognizing a touchless finger movement upon release of the button.

14. A method for touchless control suitable for use with a mobile device, comprising:
  generating an ultrasonic touchless sensory space projected one inch or more above and wider than a dimension of the display;
  calibrating a tracking of a forward projecting and backward retracting finger one inch or more along a principal axis above and approximately perpendicular to the display;
  detecting a presence of a finger or object within the touchless sensory space from a mapping of a virtual coordinate system along three-dimensions therein to a display coordinate system along two-dimensions of the device according to the calibrating along the principal axis,
  wherein a relative range of locations of the finger movement in the virtual coordinate system is mapped to an absolute range of locations in the device coordinate system;
  tracking three-dimensional movement of the finger within the touchless sensory space by pulse-echo detection of reflected ultrasonic signals one inch or more above the display;
  associating at least one finger or object movement in the virtual coordinate system with a control of a user interface component in the display coordinate system and handling a control of the device in accordance with the finger movement, by
  recognizing a first finger movement for acquiring a control;
  locking the control upon completion of the first finger movement; and
  recognizing a second finger movement for selecting the control;
  where continued touchless control is granted to acquire other controls during the lock but prevent a selection of the other controls until the lock is thereto assigned.

15. The method of claim 14, wherein the tracking a movement further comprises:
  estimating a location of the finger in the touchless sensory space for acquiring a control; and
  identifying a finger movement of the finger at the location for selecting the control.

16. The method of claim 14, further comprising visually displaying an acknowledgment that the finger has acquired the control.

17. The method of claim 14, wherein the tracking a movement further comprises:
  estimating a location of the finger in the touchless sensory space; and
  associating a control on a display of the device with the location.

18. The method of claim 14, further comprising visually displaying an acknowledgment that the finger has acquired the control.

19. The method of claim 14, further comprising:
  recognizing a finger swipe movement in the touchless sensory space for selecting the control.

20. The method of claim 14, further comprising:
  acquiring the control in response to detecting a first finger movement at the location; and selecting the control in response to a second finger movement,
wherein the acquiring locks the control, such that while the control remains locked, the second finger movement in the touchless sensory space does not select a second control where during the lock continued touchless control is granted to acquire other controls until the lock is released.

* * * * *